US012424769B2

(12) United States Patent
Tsai

(10) Patent No.: US 12,424,769 B2
(45) **Date of Patent: *Sep. 23, 2025**

(54) ELECTRONIC DEVICE

(71) Applicant: InnoLux Corporation, Miao-Li County (TW)

(72) Inventor: Tsung-Han Tsai, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 122 days.

This patent is subject to a terminal disclaimer.

(21) Appl. No.: 18/326,128

(22) Filed: May 31, 2023

(65) Prior Publication Data

US 2023/0307848 A1 Sep. 28, 2023

Related U.S. Application Data

(63) Continuation of application No. 17/069,149, filed on Oct. 13, 2020, now Pat. No. 11,705,642.

(30) Foreign Application Priority Data

Nov. 5, 2019 (CN) ........................ 201911069645.X

(51) Int. Cl.

| | |
|---|---|
| ***H01Q 21/00*** | (2006.01) |
| ***H01Q 1/38*** | (2006.01) |
| ***H01Q 1/44*** | (2006.01) |
| ***H01Q 3/36*** | (2006.01) |
| ***H01Q 21/06*** | (2006.01) |

(52) U.S. Cl.
CPC ............. *H01Q 21/065* (2013.01); *H01Q 1/38* (2013.01); *H01Q 1/44* (2013.01); *H01Q 3/36* (2013.01)

(58) Field of Classification Search
CPC .......... H01Q 21/065; H01Q 1/38; H01Q 1/44; H01Q 1/22; H01Q 21/28; H01Q 5/307; H01Q 21/06; H01Q 21/0006; H01Q 9/0457; H01Q 1/50; H01Q 3/30; H01P 1/184
See application file for complete search history.

(56) References Cited

U.S. PATENT DOCUMENTS 11,705,642 B2 * 7/2023 Tsai .......................... H01Q 1/22
343/700 MS
2019/0157762 A1 * 5/2019 Shibata ................ H01Q 9/0407

* cited by examiner

*Primary Examiner* — David E Lotter
(74) *Attorney, Agent, or Firm* — McClure, Qualey & Rodack, LLP

(57) ABSTRACT

An electronic device is provided. The electronic device includes a substrate, a first antenna unit disposed on the substrate and including a first pattern structure, a second antenna unit disposed on the substrate and including a second pattern structure, and a feeding unit disposed on the substrate and including a first feeding structure coupled to the first pattern structure and a second feeding structure coupled to the second pattern structure. The second pattern structure is different from the first pattern structure. At least one of the first feeding structure and the second feeding structure includes at least a feeding line with a folding point, and the folding point has a chamber structure or an arc-angle structure.

14 Claims, 12 Drawing Sheets

ELECTRONIC DEVICE

CROSS-REFERENCE TO RELATED APPLICATIONS

This application is a Continuation Application of U.S. patent application Ser. No. 17/069,149, filed on Oct. 13, 2020 (now U.S. Pat. No. 11,705,642), which claims priority to China Patent application Ser. No. 201911069645.X, filed on Nov. 5, 2019, which is incorporated by reference herein in its entirety.

BACKGROUND OF THE DISCLOSURE

Field of the Disclosure

The disclosure relates to an electronic device, and particularly to an antenna device.

Description of the Related Art

Electronic products have become an indispensable necessity in modern society. With the vigorous development of such electronic products, consumers have high expectations for the quality, functionality, or affordability of these products.

Some electronic products further include communication capabilities, such as antenna devices, but they have not yet met the necessary requirements in all aspects. Therefore, the development of structural designs that can further improve the performance or operational reliability of electronic products or electronic devices is currently one of the most important research topics in the industry.

BRIEF DESCRIPTION OF THE DISCLOSURE

An electronic device is provided. The electronic device includes a substrate, a first antenna unit disposed on the substrate and including a first pattern structure, a second antenna unit disposed on the substrate and including a second pattern structure, and a feeding unit disposed on the substrate and including a first feeding structure coupled to the first pattern structure and a second feeding structure coupled to the second pattern structure. The second pattern structure is different from the first pattern structure. At least one of the first feeding structure and the second feeding structure includes at least a feeding line with a folding point, and the folding point has a chamber structure or an arc-angle structure.

BRIEF SUMMARY OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
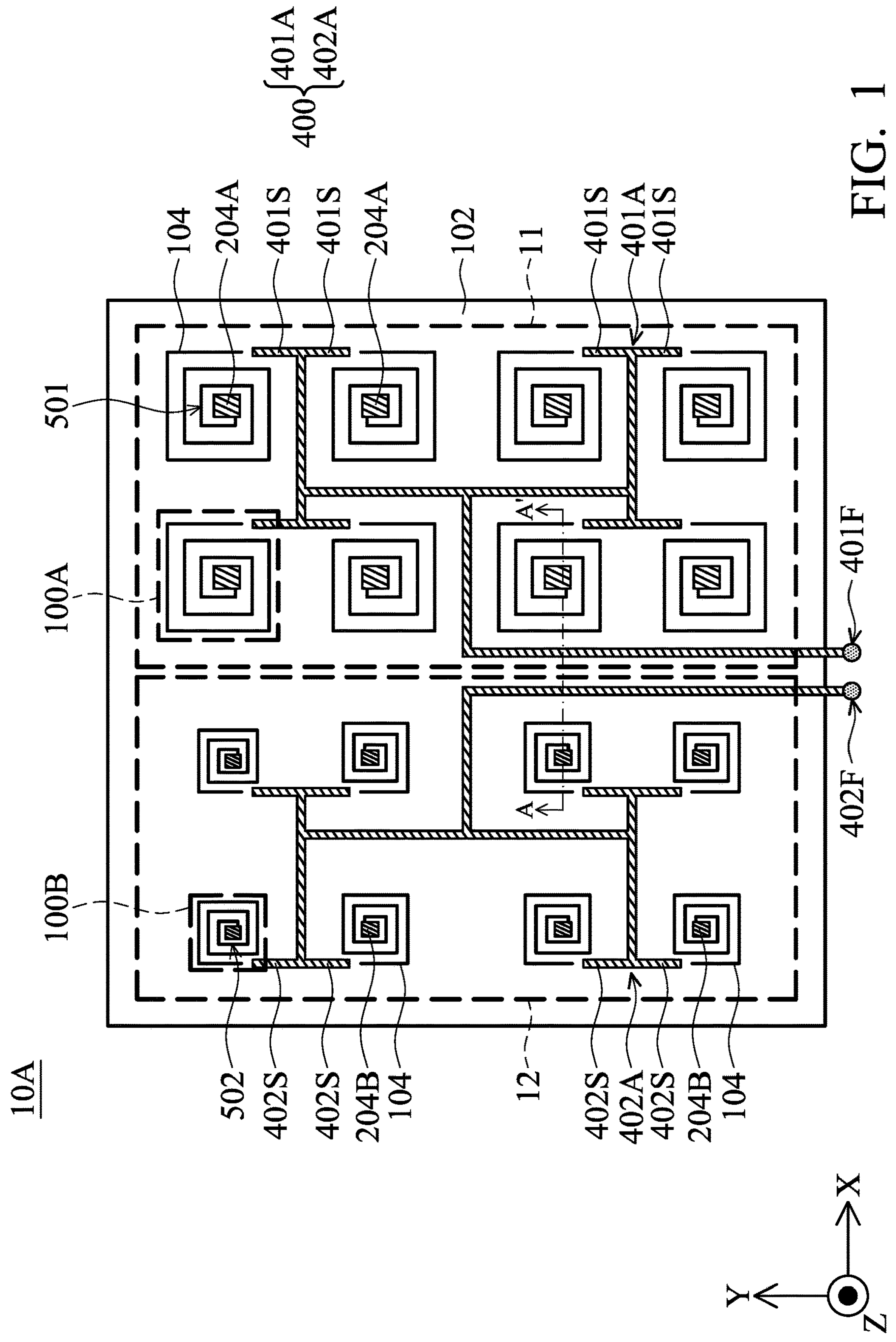
FIG. 1 is a top view of an electronic device in some embodiments of the present disclosure.

The electronic device of the present disclosure is described in more detail in the following description. In the following detailed description, for purposes of explanation, numerous specific details and embodiments are set forth in order to provide a thorough understanding of the present disclosure. The specific elements and configurations described in the following detailed description are set forth in order to clearly describe the present disclosure. It will be apparent that the exemplary embodiments set forth herein are used merely for the purpose of illustration. In addition, the drawings of different embodiments may use like and/or corresponding numerals to denote like and/or corresponding elements in order to clearly describe the present disclosure. However, the use of like and/or corresponding numerals in the drawings of different embodiments does not suggest any correlation between different embodiments.

It should be understood that the elements or devices in the drawings of the present disclosure may be present in any form or configuration known to those with ordinary skill in the art. In addition, in the embodiments, relative expressions are used. For example, “below”, “lower”, “bottom”, “above”, “higher” or “top” are used to describe the position of one element relative to another. It should be appreciated that if a device is flipped upside down, an element that is “lower” will become an element that is “higher”. It should be understood that the descriptions of the exemplary embodiments are intended to be read in connection with the accompanying drawings, which are to be considered part of the entire written description. The drawings are not drawn to scale. In fact, the size of the element may be arbitrarily enlarged or reduced in order to clearly express the features of the present disclosure. In addition, the expressions “a first material layer is disposed on or over a second material layer” may indicate the first material layer is in direct contact with the second material layer, or the first material layer is not in direct contact with the second material layer, there being one or more intermediate layers disposed between the first material layer and the second material layer.

It should be understood that, although the terms "first", "second", "third" etc. may be used herein to describe various elements, components, or portions, these elements, components, or portions should not be limited by these terms. These terms are used to distinguish one element, component, or portion from another element, component, or portion. Thus, a first element, component, region, layer, or portion discussed below could be termed a second element, component, region, layer, or portion without departing from the teachings of the present disclosure.

The terms "about", "approximately", "substantially", "roughly" typically mean +/−10% of the stated value, or +/−5% of the stated value, or +/−3% of the stated value, or +/−2% of the stated value, or +/−1% of the stated value, or +/−0.5% of the stated value. The stated value of the present disclosure is an approximate value. When there is no specific description, the stated value comprises the meaning of "about", "approximately", "substantially", "roughly". Furthermore, the terms "a range from a first value to a second value" and "a range between a first value and a second value" mean that the range comprises the first value, the second value, and other values therebetween.

In some embodiments of the present disclosure, terms concerning attachments, coupling and the like, such as "connected" and "interconnected", refer to a relationship wherein structures are secured or attached to one another either directly or indirectly through intervening structures, as well as both movable or rigid attachments or relationships, unless expressly described otherwise. In addition, the term "coupled" include any method of direct and indirect electrical connection.

Unless defined otherwise, all technical and scientific terms used herein have the same meaning as commonly understood by one of ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined.

An electronic device is provided in some embodiments of the present disclosure. The electronic device can provide different patterns for antenna units with different frequencies to allow different antenna units operating simultaneously. As a result, the performance of the electronic device may be enhanced, interference between signals having different frequencies may be reduced, or the space of the electronic device may be utilized in a more efficient manner.

In some embodiments of the present disclosure, the electronic device provided may include an antenna device, a display device (such as a liquid-crystal display device), a sensing device or a spliced device, but it is not limited thereto. In an embodiment, the electronic device may be used for modulating electromagnetic waves, but it is not limited thereto. The electronic device may be a bendable or flexible electronic device. The antenna device may be, for example, a liquid-crystal antenna, but it is not limited thereto. The spliced device may be, for example, an antenna spliced device, but it is not limited thereto. It should be noted that the electronic device may be a combination thereof, but it is not limited thereto.

Refer to FIG. 1. FIG. 1 is a top view of an electronic device 10A in some embodiments of the present disclosure. It should be noted that some elements are omitted for clarity (e.g. the second substrate 202, the conductive layer 208, etc.), and only a portion of the first modulation units 100A and the second modulation units 100B of the electronic device 10A are illustrated. In different embodiments, the number of first modulation units 100A and the second modulation units 100B of the electronic device 10A may be adjusted based on actual requirements. Furthermore, it should be realized that according to some embodiments, additional features may be added in the electronic device 10A described below. In some alternative embodiments, some features of the electronic device 10A described below may be replaced or omitted.

As shown in FIG. 1, the electronic device 10A may include a first substrate 102, a first antenna unit 11 and a second antenna unit 12. The first antenna unit 11 may include a plurality of first modulation units 100A, and the second antenna unit 12 may include a plurality of second modulation units 100B. The first modulation units 100A and/or the second modulation units 100B may be disposed on the first substrate 102, but it is not limited thereto. In some embodiments, the first antenna unit 11 and the second antenna unit 12 may be antenna units for modulating electromagnetic waves (e.g. electromagnetic waves with radio frequency or microwave).

In some embodiments, the material of first substrate 102 may include glass, quartz, sapphire, ceramic, polyimide (PI), Si, SiC, SiN, liquid-crystal polymer (LCP) material, polycarbonate (PC), photosensitive polyimide (PSPI), polyethylene terephthalate (PET), other suitable materials, or a combination thereof, but it's not limited thereto. In some embodiments, the first substrate 102 may include a printed circuit board (PCB). In some embodiments, the first substrate 102 may include a flexible substrate, a rigid substrate, or a combination thereof.

Furthermore, as shown in FIG. 1, the electronic device 10A may include a feeding unit 400 coupled to the first antenna unit 11 and the second antenna unit 12. The feeding unit 400 may include a first feeding structure 401A and a second feeding structure 402A. The first feeding structure 401A and the second feeding structure 402A may be disposed on the first substrate 102 to transmit radio frequency signals. The first feeding structure 401A may include at least one first feeding line 401S, and the second feeding structure 402A may include at least one second feeding line 402S. In some embodiments, the first feeding structure 401A may be coupled to the first antenna unit 11, and the second feeding structure 402A may be coupled to the second antenna unit 12. In some embodiments, one first feeding line 401S may correspond to one first modulation unit 100A, or one second feeding line 402S may correspond to one second modulation unit 100B, but it is not limited thereto. In some embodiments, the first feeding structure 401A may be coupled to at least one first feeding source 401F, and the second feeding structure 402A may be coupled to at least one second feeding source 402F. For example, the first feeding source 401F may receive external signal to provide to the first feeding structure 401A, but it is not limited thereto. The second feeding source 402F may provide an initial feed-in wave, but it is not limited thereto. In some embodiment, the initial feed-in wave may be an electromagnetic wave with high frequency. In another embodiment, the first feeding source 401F may provide an initial feed-in wave, and the second feeding source 402F may receive external signal, but it is not limited thereto. Furthermore, in some embodiments, the first feeding structure 401A and/or the second feeding structure 402A may be further coupled to a signal processor, a signal modulator, or a combination thereof (not shown) in some embodiments. However, the present disclosure is not limited thereto. For example, both of the first feeding structure 401A and the second feeding structure 402A may be coupled to feeding sources for transmitting signals or feeding sources for receiving signals, and the feeding sources coupled to the first feeding structure 401A and the second feeding structure 402A may have different signal frequencies.

In some embodiments, the first feeding structure 401A or the second feeding structure 402A may include a conductive material. In some embodiments, the conductive material may include metal, such as Cu, Ag, Sn, Al, Mo, W, Au, Cr, Ni, Pt, Ti, copper alloy, silver alloy, tin alloy, aluminum alloy, molybdenum alloy, tungsten alloy, gold alloy, chromium alloy, nickel alloy, platinum alloy, titanium alloy, other suitable conductive materials, or a combination thereof, but it is not limited thereto.

In some embodiments, the materials of the first feeding structure 401A and the second feeding structure 402A may be identical or different, but it is not limited thereto. In some embodiments, the second feeding structure 402A connected to the second feeding source 402F usually needs greater energy, so the resistivity of the first feeding structure 401A connected to the first feeding source 401F may be greater than the resistivity of the second feeding structure 402A connected to the second feeding source 402F. In an embodiment, the thickness of the second feeding structure 402A may be greater than the thickness of the first feeding structure 401A, but it is not limited thereto. The thickness of the second feeding structure 402A is the minimum thickness in the Z direction (the normal direction of the first substrate 102). The thickness of the first feeding structure 401A is the minimum thickness in the Z direction. In some embodiments, the first feeding structure 401A and/or the second feeding structure 402A may include a single layer structure or a multilayer structure, but it is not limited thereto.

Furthermore, the first antenna unit 11 may include a plurality of first phase shifting structures 501 (or referred to as microstrip lines). The second antenna unit 12 may include a plurality of second phase shifting structures 502. The first phase shifting structures 501 and the second phase shifting structures 502 may be disposed on the first substrate 102. The first phase shifting structures 501 may be used to feed out a treated or modulated electromagnetic wave signal, for example, to feed out an electromagnetic wave signal to the first feeding line 401S. The second phase shifting structures 502 may be used to receive radio frequency signals from the second feeding structure 402A. For example, the radio frequency signals may be transmitted to the second phase shifting structures 502 by the second feeding structure 402A through the second feeding line 402S in the way of electromagnetic coupling, but the present disclosure is not limited thereto. For example, the electric potentials of the first phase shifting structures 501 or the second phase shifting structures 502 may be changed to modulate the electric field or magnetic field between the first phase shifting structures 501 or the second phase shifting structures 502 and a conductive layer 208 (FIG. 10) to change the refractive index of the modulation material over or around to the first phase shifting structures 501 or the second phase shifting structures 502, and to further change the phase shift of the passing electromagnetic waves. In another embodiment, the electric potentials of the first phase shifting structures 501 or the second phase shifting structures 502 may be changed to change the electric field or magnetic field between the first phase shifting structures 501 or the second phase shifting structures 502 and a conductive layer 208 to modulate the dielectric coefficient of the modulation material over or around to the first phase shifting structures 501 or the second phase shifting structures 502, and to further change the capacitance.

In some embodiments, the material of the first phase shifting structures 501 or the second phase shifting structures 502 may include a conductive material, a transparent conductive material, or a combination thereof. The conductive material may be similar to the material of the first feeding structure 401A, which will not be repeated here. The transparent conductive material may include a transparent conductive oxide (TCO). For example, the transparent conductive oxide may include indium tin oxide (ITO), tin oxide (SnO), zinc oxide (ZnO), indium zinc oxide (IZO), indium gallium zinc oxide (IGZO), indium tin zinc oxide (ITZO), antimony tin oxide (ATO), antimony zinc oxide (AZO), or a combination thereof, but it is not limited thereto.

Furthermore, in some embodiments, the first phase shifting structures 501 or the second phase shifting structures 502 may be coupled to low frequency voltages. In some embodiments, the range of the low frequency voltages may be between ±0.1 V to ±100V, between ±0.5V to ±50V, or between ±1V to ±15V, but the present disclosure is not limited thereto.

Furthermore, in some embodiments, the first phase shifting structures 501 or the second phase shifting structures 502 may further electrically connected to a driving element (not shown). In some embodiments, the driving element may include an active driving element (e.g. a thin film transistor (TFT)), a passive driving element, or a combination thereof. Specifically, in some embodiments, the first phase shifting structures 501 or the second phase shifting structures 502 may be electrically connected to a thin film transistor, and the thin film transistor may further be electrically connected to a data line and/or a scanning line (gate line). In some embodiments, the first phase shifting structures 501 or the second phase shifting structures 502 may be electrically connected to an integrated circuit (IC) or a digital to analog converter.

Furthermore, the first antenna unit 11 may include first patches 204A, and the second antenna unit 12 may include second patches 204B. The first patches 204A may be disposed on at least one of the plurality of the first phase shifting structures 501, and the second patches 204B may be disposed on at least one of the plurality of the second phase shifting structures 502. In other words, in some embodiments, in the normal direction of the first substrate 102 (e.g. Z direction shown in the figure), the first patch 204A may at least partially overlap the first phase shifting structure 501, and the second patch 204B may at least partially overlap the second phase shifting structure 502. In this disclosure, the term "overlap" may include completely overlap and partially overlap if not specified. In some embodiments, the first patches 204A or the second patches 204B may electrically floated, or coupled to a given potential (e.g., ground) or other functional circuits, but the present disclosure is not limited thereto. In some embodiments, the area of the first patch 204A and the area of the second patch 204B may be different.

In some embodiments, the material of the first patches 204A or the second patches 204B may include a conductive material, a transparent conductive material, or a combination thereof. The conductive material and the transparent conductive material are similar to the material of the first phase shifting structure 501 or the second phase shifting structure 502, which will not be repeated here.

In some embodiments, the first phase shifting structures 501, the second phase shifting structures 502, the first patch 204A and/or the second patch 204B may be patterned by using one or more photolithography processes and etching processes, but it is not limited thereto. In some embodiments, the photolithography process may include photoresist coating (such as spin coating), soft bake, hard bake, mask alignment, exposure, post-exposure bake, photoresist development, cleaning, drying, etc., but it is not limited thereto. In some embodiments, the etching process may include a dry etching process or a wet etching process, but it is not limited thereto.

In some embodiments, the first patches 204A or the second patches 204B may be provided by a physical vapor deposition (PVD) process, a chemical vapor deposition (CVD) process, a coating process, an electroplating process, an electroless plating process, another suitable method, or a combination thereof. The physical vapor deposition process may include, for example, a sputtering process, an evaporation process, or a pulsed laser deposition, but it is not limited thereto. The chemical vapor deposition process may include, for example, a low pressure chemical vapor deposition (LPCVD) process, a low temperature chemical vapor deposition (LTCVD) process, a rapid thermal chemical vapor deposition (RTCVD) process, a plasma enhanced chemical vapor deposition (PECVD) process, an atomic layer deposition (ALD) process, etc., but it is not limited thereto.

In some embodiments, the first phase shifting structures 501 and the second phase shifting structures 502 may be designed to have different patterns. In other words, the first antenna unit 11 may have a first pattern, the second antenna unit 12 may have a second pattern, and the first pattern and the second pattern are different. In some embodiments, "the first pattern and the second pattern are different" comprises that the total lengths of the first pattern and the second pattern (e.g. the total length of the first phase shifting structures 501 and the total length of the second phase shifting structures 502) are different, the areas of the first pattern and the second pattern (e.g. the area of the smallest rectangle that can cover the first phase shifting structures 501 and the area of the smallest rectangle that can cover the second phase shifting structures 502) are different, and/or there are a different number of turning points in the first pattern than there are in the second pattern (e.g. the number of turning points in the first phase shifting structures 501 and the number of turning points in the second phase shifting structures 502), but it is not limited thereto. Examples wherein the first pattern and the second pattern are different will be described in more detail later. Furthermore, "the first pattern and the second pattern are different" in this disclosure may exclude embodiments in which the first pattern and the second pattern are in mirror symmetry, so that the first antenna unit 11 and the second antenna unit 12 may receive or transmit signals with different frequencies.

Figure 3:
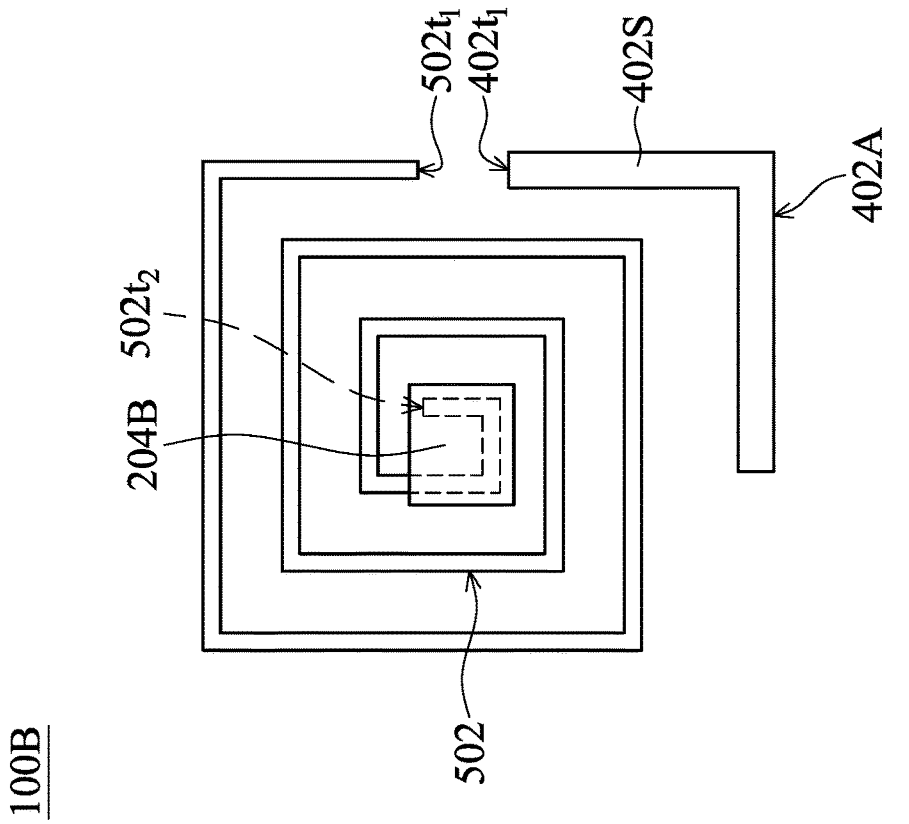
FIG. 3 is an enlarged view of a second modulation unit shown in the block in FIG. 1.
Figure 2:
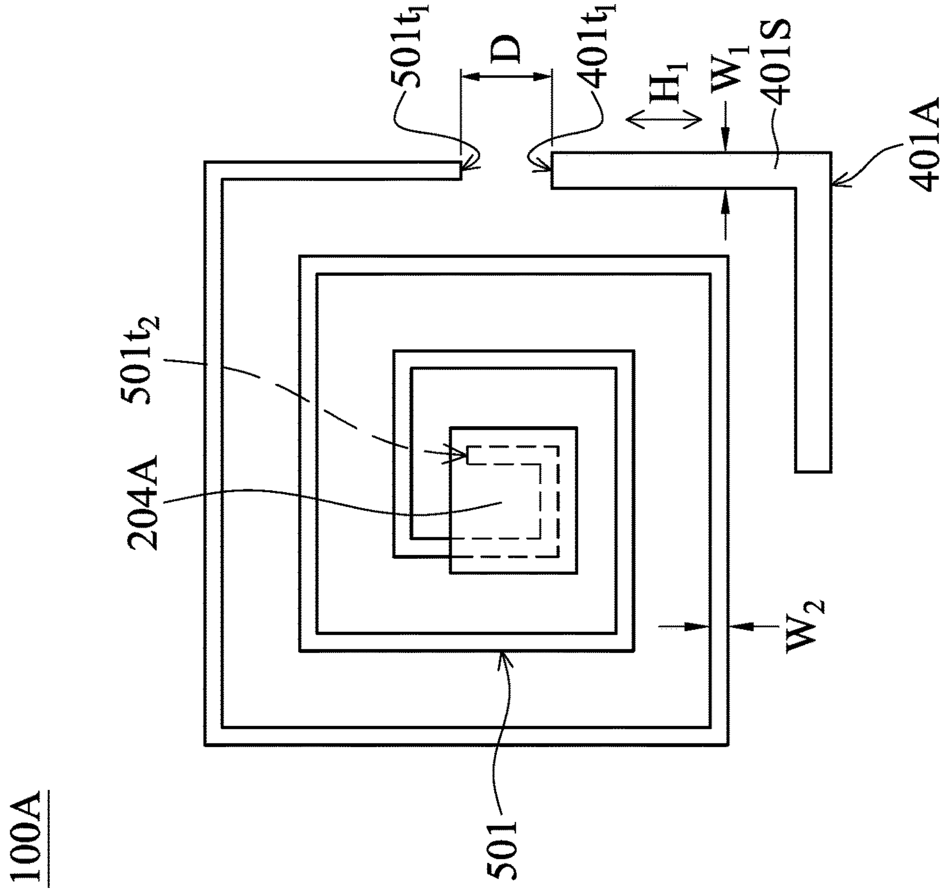
FIG. 2 is an enlarged view of a first modulation unit shown in the block in FIG. 1.

Refer to FIG. 2 and FIG. 3, which are local enlarged views of the electronic device 10A in some embodiments of the present disclosure. Specifically, FIG. 2 is an enlarged view of the first modulation unit 100A in the block of FIG. 1, and FIG. 3 is an enlarged view of the second modulation unit 100B in the block of FIG. 1. It should be noted that the first modulation unit 100A and the second modulation unit 100B of the electronic device 10A may be different. The example where the first modulation unit 100A is different from the second modulation unit 100B will be described later in more detail.

The first phase shifting structure 501 may be disposed adjacent to the first feeding structure 401A, and the second phase shifting structure 502 may be disposed adjacent to the second feeding structure 402A. The first phase shifting structure 501 and/or the second phase shifting structure 502 may have a spiral shape or a loop shape, but it is not limited thereto. The shape configurations of the first phase shifting structure 501 and the second phase shifting structure 502 will be described later. As shown in FIG. 2, an end of the first feeding line 401S of the first feeding structure 401A has an end point 401$t_1$, an end of the first phase shifting structure 501 has an end point 501$t_1$, and the end point 401$t_1$ is adjacent to the end point 501$t_1$. Furthermore, as shown in FIG. 3, an end of the second feeding line 402S of the first feeding structure 402A has an end point 402$t_1$, an end of the second phase shifting structure 502 has an end point 502$t_1$, and the end point 402$t_1$ is adjacent to the end point 502$t_1$.

In some embodiments, the end point 401$t_1$ of the first feeding line 401S of the first feeding structure 401A is relative to the end point 501$t_1$ of the first phase shifting structure 501. Furthermore, in some embodiments, the extension direction of the first feeding line 401S that is adjacent to the end point 501$t_1$ may be substantially parallel to the extension direction of a portion of the first phase shifting structure 501, but it is not limited thereto. Specifically, a distance D may be provided between the end point 401$t_1$ of the first feeding line 401S and the end point 501$t_1$ of the first phase shifting structure 501. In some embodiments, the distance D is between 0.05 mm to 5 mm (i.e. 0.05 mm≤distance D≤5 mm), such as 0.5 mm, 1.5 mm, 2 mm, 2.5 mm, or 4 mm. Moreover, it should be noted that according to some embodiments of the present disclosure, as shown in FIG. 2, the distance D means the minimum distance measured in the extension direction of the first feeding line 401S (e.g. the first length direction $H_1$). It should be noted that if the distance D is too small (e.g. less than 0.5 mm), the first feeding structure 401A may contact the first phase shifting structure 501 because of the tolerance during the process to cause short circuit. On the contrary, if the distance D is too large (e.g. greater than 5 mm), the feeding source that emits signals (e.g. the second feeding structure 402A in FIG. 3) may be too far away from the corresponding phase shifting structure (e.g. the first phase shifting structure 501) to be coupled to the corresponding phase shifting structure, making it harder for a radio frequency signal to be fed in the corresponding phase shifting structure (e.g. the second phase shifting structure 502), but it is not limited thereto. The positional relationship between the second feeding line 402S of the second feeding structure 402A and the second phase shifting structure 502 may be substantially identical or similar to the positional relationship between the first feeding line 401S of the first feeding structure 401A and the first phase shifting structure 501, and is not repeated.

According to some embodiments of the present disclosure, the term "length direction" means a direction that is along or substantially parallel to a long axis of an object. The long axis is defined as a straight line extending across the center of an object in a lengthwise manner. For a long and narrow object or an oval object, the long axis is closest to its longitudinal maximum dimension. For an object that does not have an accurate long axis, its long axis may represent the longest edge of the smallest rectangle that can surround the object.

In some embodiments, the size of the first feeding structure 401A or the second feeding structure 402A may be greater than the size of the first phase shifting structure 501 or the second phase shifting structure 502. For example, the width of the first feeding structure 401A or the second feeding structure 402A (e.g. line width) may be one to ten times of the width of the first phase shifting structure 501 or the second phase shifting structure 502, respectively. Furthermore, the thickness of the first feeding structure 401A or the second feeding structure 402A may be one to ten times of the thickness of the first phase shifting structure 501 or the second phase shifting structure 502 (e.g. the thickness in the Z direction), respectively. As a result, the first feeding structure 401 or the second feeding structure 402 may transmit higher energy than the first phase shifting structure 501 or the second phase shifting structure 502, but they are not limited thereto.

In an embodiment, the first feeding line 401S of the first feeding structure 401A may include a first width $W_1$. In some embodiments, the range of the first width $W_1$ is between 10 μm to 500 μm (i.e. 10 μm≤ the first width $W_1$≤500 μm), such as 50 μm, 100 μm, 200 μm, 250 μm, or 300 μm.

The first phase shifting structure 501 may include a second width $W_2$. In some embodiments, the range of the second width $W_2$ is between 5 μm to 500 μm (i.e. 5 μm≤ the second width $W_2$≤500 μm), such as 50 μm, 150 μm, 200 μm, 250 μm, or 400 μm.

In some embodiments, the first width $W_1$ of the first feeding line 401S may be greater than or equal to the second width $W_2$ of the first phase shifting structure 501. Furthermore, it should be realized that according to some embodiments of the present disclosure, the first width $W_1$ of the first feeding line 401S means the maximum width of any cross-section that is substantially perpendicular to the extension direction of the first feeding line 401S (e.g. the first length direction $H_1$). Similarly, according to some embodiments, the second width $W_2$ of the first phase shifting structure 501 means the maximum width of any cross-section that is substantially perpendicular to the extension direction (not shown) of the first phase shifting structure 501. The width range and the distance relationship of the second feeding line 402S of the second feeding structure 402A and the second phase shifting structure 502 are respectively similar to the width range and the distance relationship of the first feeding line 401S of the first feeding structure 401A and the first phase shifting structure 501, and is not repeated.

As stated above, the first patch 204A may be disposed on the first phase shifting structure 501, and at least partially overlaps the first phase shifting structure 501. For example, as shown in FIG. 2, in some embodiments, in the normal direction of the first substrate 102, the first patch 204A may overlap another end point 501$t_2$ of the first phase shifting structure 501. Furthermore, in some embodiments, in the normal direction of the first substrate 102, the first patch 204A may overlap a first opening 209A of the conductive layer 208 (for example, please refer to FIG. 10). In other words, in some embodiments, the first patch 204A may overlap the end point 501$t_2$ of the first phase shifting structure 501 and the first opening 209A. Identically, in some embodiments, the second patch 204B may overlap the end point 502$t_2$ of the second phase shifting structure 502 and the second opening 209B.

It should be noted that the first modulation unit 100A is different from the second modulation unit 100B in FIG. 2 and FIG. 3. For example, the total length, the covered area, the number of turning points, or the turning configurations of the first phase shifting structure 501 and the second phase shifting structure 502 may be different. Moreover, the lengths, widths, aspect ratios, areas, shapes of the first patch 204A and the second patch 204B also may be different, but it is not limited thereto. In other words, the first phase shifting structure 501 and the second phase shifting structure 502 may have different patterns. For example, at least one of the total length, the covered area, the number of turning points, or the turning configurations of the first phase shifting structure 501 may be greater than the corresponding parameter of the second phase shifting structure 502 (e.g. the total length of the first phase shifting structure 501 is greater than the total length of the second phase shifting structure 502). The examples where the first modulation unit 100A is different from the second modulation unit 100B will be described in more detail in FIG. 4 to FIG. 9.

Figure 5:
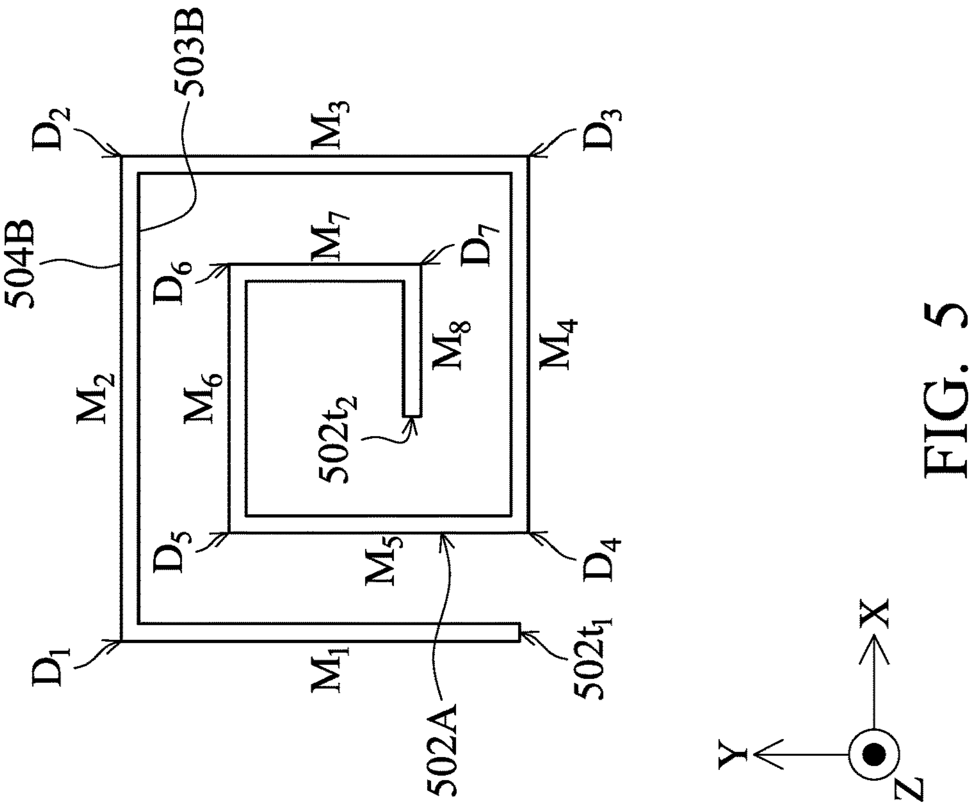
FIG. 5 is a schematic view of a second phase shifting structure in some embodiments of the present disclosure.
Figure 4:
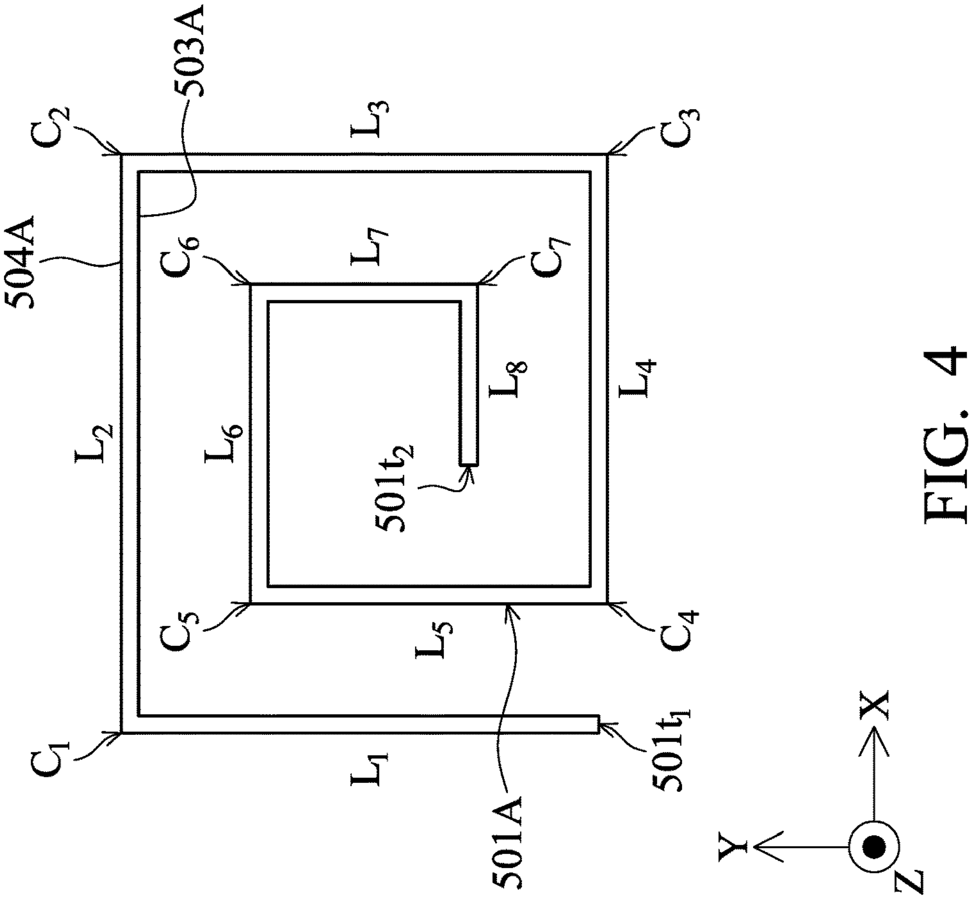
FIG. 4 is a schematic view of a first phase shifting structure in some embodiments of the present disclosure.

FIG. 4 and FIG. 5 are schematic views of a first phase shifting structure 501A and a second phase shifting structure 502A in some embodiments of the present disclosure, respectively. In FIG. 4, the first phase shifting structure 501A comprises the end point 501$t_1$, the end point 501$t_2$, and a folding point $C_1$, a folding point $C_2$, a folding point $C_3$, a folding point $C_4$, a folding point $C_5$, a folding point $C_6$, and a folding point $C_7$ positioned between the end point 501$t_1$ and the end point 501$t_2$. A distance $L_1$ is between the end point 501$t_1$ and the folding point $C_1$. A distance $L_2$ is between the folding point $C_1$ and the folding point $C_2$. A distance $L_3$ is between the folding point $C_2$ and the folding point $C_3$. A distance $L_4$ is between the folding point $C_3$ and the folding point $C_4$. A distance $L_5$ is between the folding point $C_4$ and the folding point $C_5$. A distance $L_6$ is between the folding point $C_5$ and the folding point $C_6$. A distance $L_7$ is between the folding point $C_6$ and the folding point $C_7$. A distance $L_8$ is between the folding point $C_7$ and the end point 501$t_2$. The total length of the first phase shifting structure 501A may be defined as the sum of the distance $L_1$ to the distance $L_8$, that is, $L_1+L_2+L_3+L_4+L_5+L_6+L_7+L_8$.

In FIG. 5, the second phase shifting structure 502A comprises the end point 502$t_1$, the end point 502$t_2$, and a folding point $D_1$, a folding point $D_2$, a folding point $D_3$, a folding point $D_4$, a folding point $D_5$, a folding point $D_6$, and a folding point $D_7$ positioned between the end point 502$t_1$ and the end point 502$t_2$. A distance $M_1$ is between the end point 502$t_1$ and the folding point $D_1$. A distance $M_2$ is between the folding point $D_1$ and the folding point $D_2$. A distance $M_3$ is between the folding point $D_2$ and the folding point $D_3$. A distance $M_4$ is between the folding point $D_3$ and the folding point $D_4$. A distance $M_5$ is between the folding point $D_4$ and the folding point $D_5$. A distance $M_6$ is between the folding point $D_5$ and the folding point $D_6$. A distance $M_7$ is between the folding point $D_6$ and the folding point $D_7$. A distance Mg is between the folding point $D_7$ and the end point 502$t_2$. The total length of the second phase shifting structure 502A may be defined as the sum of the distance $M_1$ to the distance Mg, that is, $M_1+M_2+M_3+M_4+M_5+M_6+M_7+M_8$.

As a result, the total length of the first phase shifting structure 501A (distances $L_1+L_2+L_3+L_4+L_5+L_6+L_7+L_8$) is different from the total length of the second phase shifting structure 502A (distances $M_1+M_2+M_3+M_4+M_5+M_6+M_7+M_8$). Because the first phase shifting structure 501A and the second phase shifting structure 502A have spiral structures, the total length of the first phase shifting structure 501A or the second phase shifting structure 502A may be defined as an average of the length of the inner circumference of the spiral structure (e.g. an inner circumference 503A of the first phase shifting structure 501A or an inner circumference 503B of the second phase shifting structure 502A) and the length of the outer circumference of the spiral structure (e.g. an outer circumference 504A of the first phase shifting structure 501A or an outer circumference 504B of the second phase shifting structure 502A). In some embodiments, the total length of the first phase shifting structure 501A may be greater than the total length of the second phase shifting structure 502A, so that the first modulation unit 100A may provide a greater phase shift or a greater capacitance than the second modulation unit 100B.

Furthermore, as shown in FIG. 4 and FIG. 5, the area covered by the first phase shifting structure 501A is different from the area covered by the second phase shifting structure 502A. In some embodiments of the present disclosure, the "area covered by the phase shifting structure" may be defined as the area of the smallest rectangle that can cover the phase shifting structure. For example, the smallest rectangle that can cover the first phase shifting structure 501A has its greatest dimension $L_1$ in the Y direction, and has its greatest dimension $L_2$ in the X direction. In an embodiment, the area of the smallest rectangle that can cover the second phase shifting structure 502A is greater than the area of the smallest rectangle that can cover the first phase shifting structure 501A, but the present disclosure is not limited thereto. The sizes of the first phase shifting structure 501A and the second phase shifting structure 502A may be changed based on different requirements.

The first antenna unit 11 and the second antenna unit 12 may receive or transmit signals with different frequencies by making the first phase shifting structure 501A and the second phase shifting structure 502A have different total lengths or coverage areas, so that the interference between the signals may be reduced.

Figure 6:
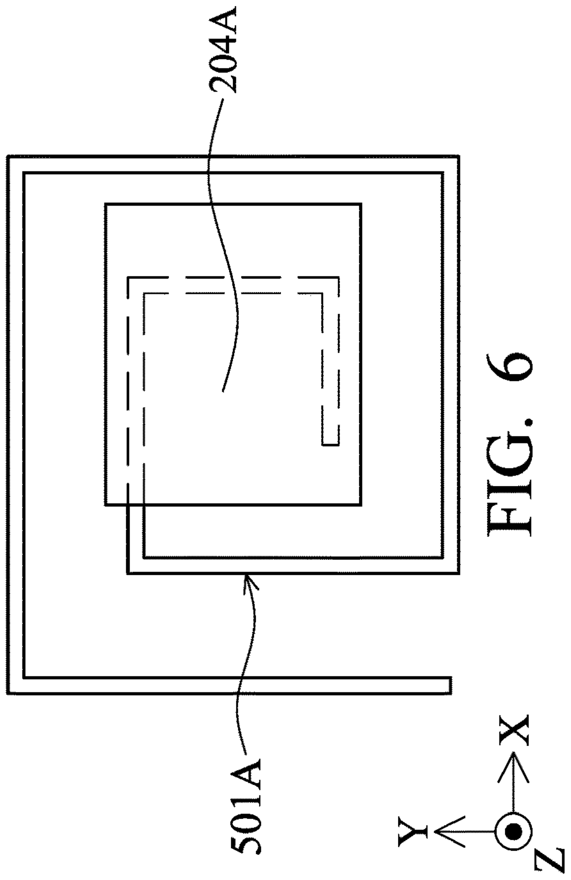
FIG. 6 is a schematic view of the first phase shifting structure shown in FIG. 4 plus a first patch.
Figure 7:
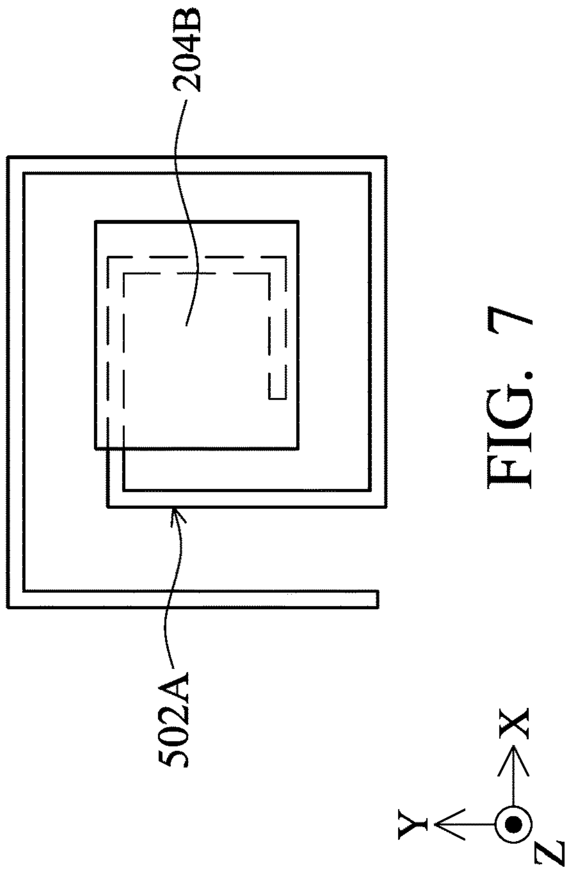
FIG. 7 is a schematic view of the second phase shifting structure shown in FIG. 5 plus a second patch.

FIG. 6 and FIG. 7 are schematic views of the first phase shifting structure 501A and the second phase shifting structure 502A in FIG. 4 and FIG. 5 plus the first patch 204A and the second patch 204B, respectively. The area of the first phase shifting structure 501A is greater than the area of the second phase shifting structure 502A, so the area of the first patch 204A may be greater than the second patch 204B. The first modulation unit 100A and the second modulation unit 100B may receive or transmit signals having different frequencies by making the first patch 204A and the second patch 204B have different areas.

Figure 8:
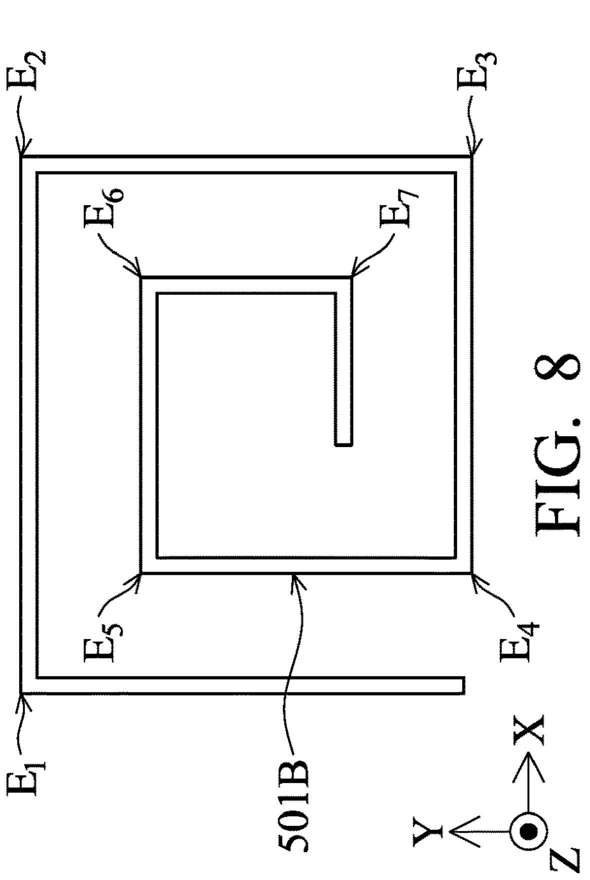
FIG. 8 is a schematic view of a first phase shifting structure in other embodiments of the present disclosure.
Figure 9:
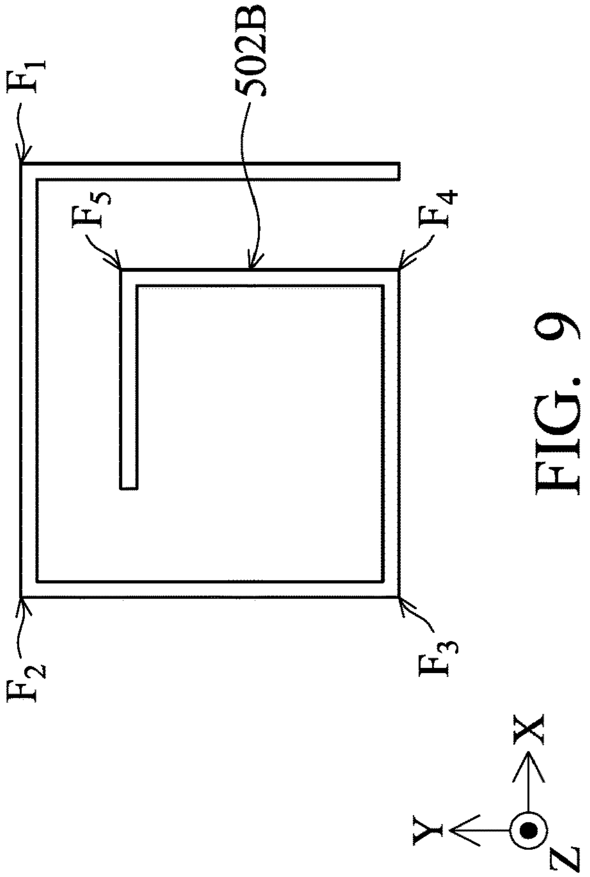
FIG. 9 is a schematic view of a second phase shifting structure in other embodiments of the present disclosure.

FIG. 8 and FIG. 9 are schematic views of a first phase shifting structure 501B and a second phase shifting structure 502B in other embodiments of the present disclosure, respectively. The first phase shifting structure 501B may include seven folding points ($E_1$, $E_2$, $E_3$, $E_4$, $E_5$, $E_6$, $E_7$) in FIG. 8, and the second phase shifting structure 502B may include five folding points ($F_1$, $F_2$, $F_3$, $F_4$, $F_5$). In other words, the number of folding points of the first phase shifting structure 501B may me different from the number of folding points of the second phase shifting structure 502B, such as the number of folding points of the first phase shifting structure 501B may be greater than the number of folding points of the second phase shifting structure 502B. However, the present disclosure is not limited thereto. The first phase shifting structure 501B and the second phase shifting structure 502B may have different amounts of folding points, depending on design requirements. The first antenna unit 11 and the second antenna unit 12 may receive or transmit signals having different frequency by changing the number of folding points of the first phase shifting structure 501B or the number of folding points of the second phase shifting structure 502B, and the interference between the signals of the first antenna unit 11 and the second antenna unit 12 may be reduced.

Figure 10:
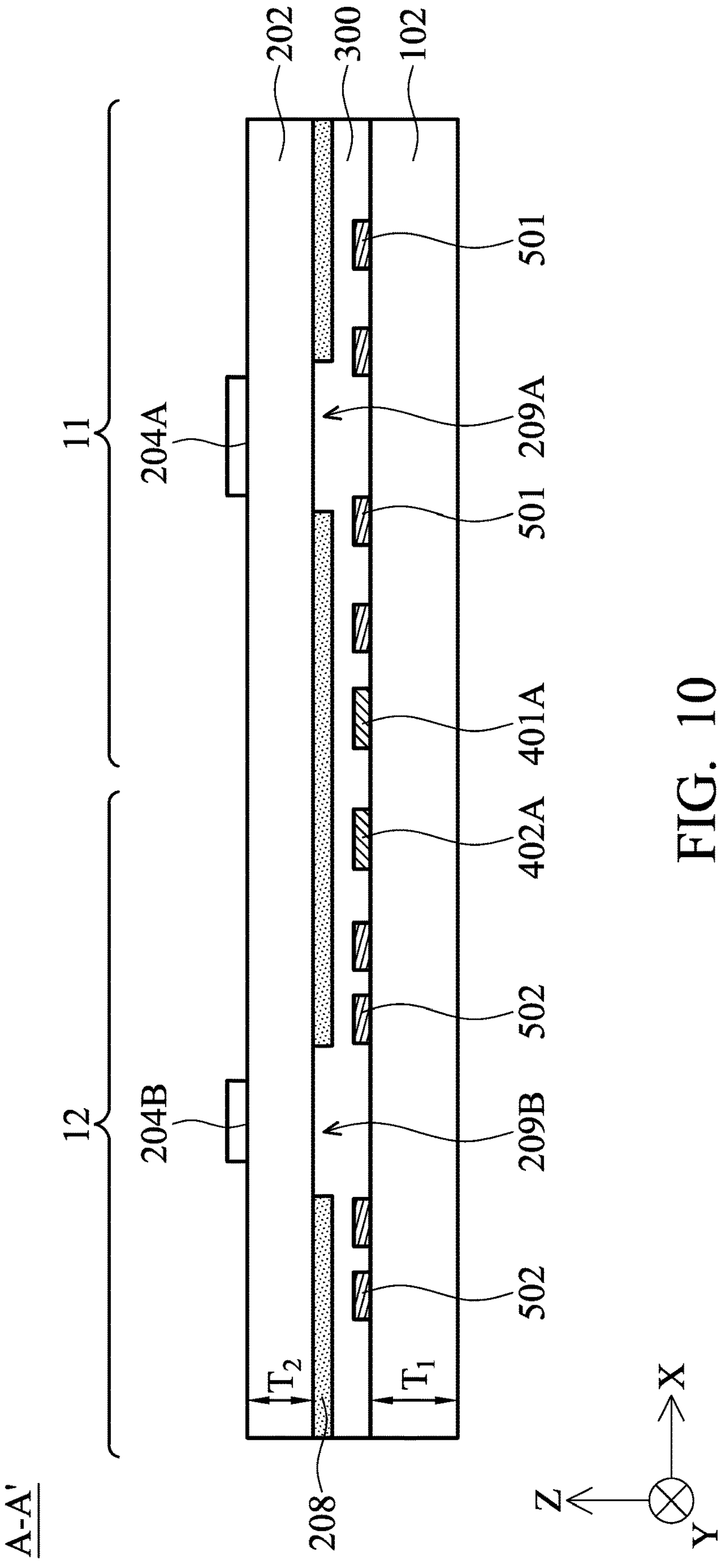
FIG. 10 is a cross-sectional view illustrated along the line A-A' in FIG. 1.

Refer to FIG. 10, which is a schematic cross-sectional view of the electronic device 10A in some embodiments of the present disclosure. Specifically, FIG. 10 is a cross-sectional view illustrated along the line A-A' in FIG. 1. As mentioned above, the electronic device 10A comprises a first substrate 102, a second substrate 202, and a liquid-crystal layer 300. The liquid-crystal layer 300 may be positioned between the first substrate 102 and the second substrate 202.

In some embodiments, the material of the liquid-crystal layer 300 may include nematic liquid crystal, smectic liquid crystal, cholesteric liquid crystal, blue-phase liquid crystal, another suitable liquid-crystal material, or a combination thereof, but it is not limited thereto. However, according to other embodiments, the liquid-crystal layer 300 may be replaced by a material that can modulate refractive index or electromagnetic wave, such as transition metal nitride, electro-optics material, or a combination thereof, but it is not limited thereto. For example, the electro-optical material may include $LiNbO_3$, $LiTaO_3$, CdTe, $NH_4H_2PO_4$, $KH_2PO_4$, KTN, PZT, transition metal nitride (TiN, HfN, TaN, or ZrN), or a combination thereof, but it is not limited thereto. In an embodiment, the liquid-crystal layer 300 may include isothiocyanate or another highly polar functional group, but it is not limited thereto.

In some embodiments, before the first substrate 102 is assembled with the second substrate 202, the liquid-crystal layer 300 may be provided by one drop filling (ODF), or the liquid-crystal layer 300 may be filled by vacuum filling after assembly, but the present disclosure is not limited thereto.

In some embodiments, different electric fields may be applied to the liquid-crystal layer 300 to adjust the phase shift or capacitance, so that the transmission direction of the electromagnetic signal passing the first opening 209A and the first patch 204A or passing the second opening 209B and the second patch 204B may be controlled.

As mentioned above, in some embodiments, the electronic device 10A comprises a conductive layer 208, as shown in FIG. 10. The conductive layer 208 may be disposed on the second substrate 202, and can position between the liquid-crystal layer 300 and the second substrate 202. In detail, in some embodiments, the conductive layer 208 may be patterned to have a first opening 209A that corresponds to the first patch 204A and a second opening 209B that corresponds to the second patch 204B. In some embodiments, the conductive layer 208 may be grounded. In some embodiments, in the normal direction of the first substrate 102, the area of the first patch 204A may be less than or equal to the area of the first opening 209A, and the area of the second patch 204B may be less than or equal to the area of the second opening 209B. In an embodiment, a portion of the first opening 209A may be not overlapped with the first patch 204A, or a portion of the second opening 209B may be not overlapped with the second patch 204B to improve the signal transmission.

In some embodiments, the material of the conductive layer 208 may include the aforementioned conductive material, the transparent conductive material, or a combination thereof, and is not repeated.

In some embodiments, the conductive layer 208 may be provided by aforementioned physical vapor deposition process, the chemical vapor deposition process, the electroplating process, the electroless plating process, other suitable methods, or a combination thereof. Moreover, the conductive layer 208 may be patterned by the aforementioned photolithography process and etching process.

Furthermore, in some embodiments, the first substrate 102 or the second substrate 202 may be a flexible substrate, so that the flexibility or plasticity of the electronic device 10A may be enhanced. As a result, the electronic device 10A is advantageous to install on the surface of various objects, such as cars, motorcycles, airplanes, ships, buildings, or other applicable objects, but the present disclosure is not limited thereto.

Moreover, the first substrate 102 may have a first thickness $T_1$, and the second substrate 202 may have a second thickness $T_2$. In some embodiments, the first thickness $T_1$ of the first substrate 102 may be greater than or equal to the second thickness $T_2$ of the second substrate 202, but it is not limited thereto. It should be noted that the second substrate 202 is the substrate that the electromagnetic signal mainly passing through, so the dielectric loss of the electromagnetic wave radiated from the first patch 204A or the second patch 204B or the electromagnetic wave going to enter the first patch 204A or the second patch 204B may be reduced, but it is not limited thereto.

Furthermore, according to some embodiments of the present disclosure, the "first thickness $T_1$" of the first substrate 102 and the "second thickness $T_2$" of the second substrate 202 mean the maximum thicknesses measured in the normal directions (Z direction) of the first substrate 102 and the second substrate 202, respectively.

In addition, in accordance with the embodiments of the present disclosure, an optical microscopy (OM), a scanning electron microscope (SEM), a film thickness profiler ($\alpha$-step), an ellipsometer, or other suitable methods may be used to measure the thickness or the width of each element, or distance between the elements. Specifically, in some embodiments, after the liquid-crystal layer 300 is removed, a scanning electron microscope may be used to obtain any cross-sectional image of the structure and measure the thickness or width of each element, or distance between the elements in the image.

Figure 11:
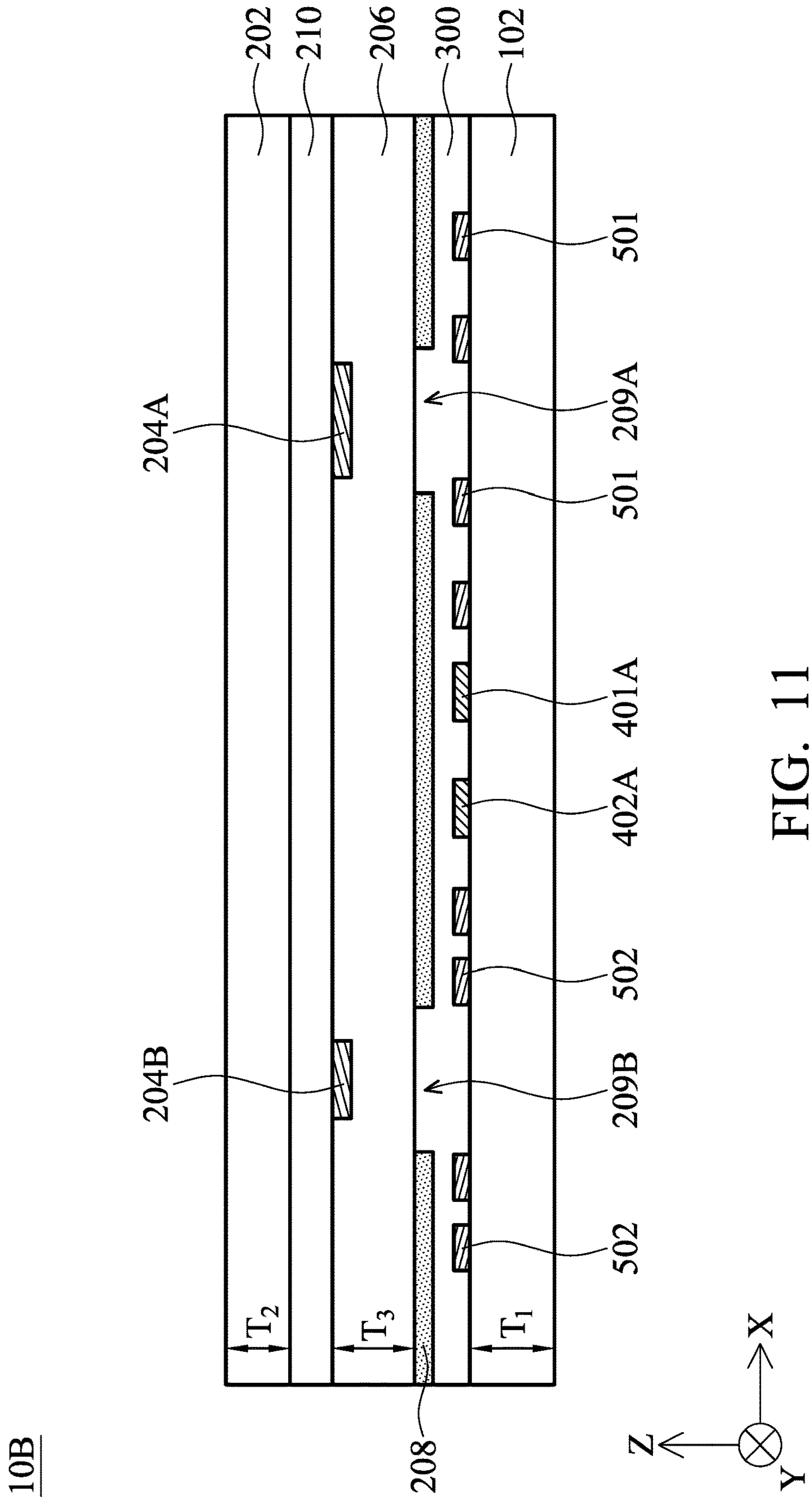
FIG. 11 is a cross-sectional view of an electronic device in other embodiments of the present disclosure.

Although the first patch 204A and the second patch 204B are disposed on the second substrate 202, and disposed on different sides of the second substrate 202 than the conductive layer 208, the present disclosure is not limited thereto. For example, FIG. 11 is a cross-sectional view of an electronic device 10B in some alternative embodiments of the present disclosure. In these embodiments, a dielectric layer 206 and/or a buffer layer 210 may be disposed between the first substrate 102 and the second substrate 202, and the first patch 204A and the second patch 204B may be disposed between the dielectric layer 206 and the second substrate 202. The first patch 204A, the second patch 204B, and the conductive layer 208 may be disposed between the first substrate 102 and the second substrate 202.

In some embodiments, the material of the dielectric layer 206 may include an organic material, an inorganic material, or a combination thereof, but it's not limited thereto. In some embodiments, the organic material may include polyimide (PI), polymethylmethacrylate (PMMA), polyethylene terephthalate (PET), liquid-crystal polymer (LCP) material, polyethylene (PE), polyethersulfone (PES), polycarbonate (PC), isoprene, phenol-formaldehyde resin, benzocyclobutene (BCB), perfluorocyclobutane (PECB), other suitable materials, or a combination thereof, but it's not limited thereto. In some embodiments, the inorganic material may include silicon oxide, silicon nitride, silicon oxynitride, aluminum oxide, aluminum nitride, aluminum oxynitride, titanium oxide, other suitable materials, or a combination thereof, but it's not limited thereto.

In some embodiments, the dielectric layer 206 may be provided by the aforementioned physical vapor deposition process, the chemical vapor deposition process, the coating process, the printing process, other suitable processes, or a combination thereof.

As shown in FIG. 11, in some embodiments, the dielectric layer 206 may have a single layer structure or a multilayered structured. In particular, in some embodiments, the number of layers of the dielectric layer 206 may range between 2 layers to 50 layers (2≤the number≤50), such as 6 layers, 10 layers, 20 layers, or 30 layers, etc., but it is not limited thereto. In some embodiments, the layers of the dielectric layer 206 that has multiple layers may be provided by an identical material or different materials, or the material of a portion of the layers may be identical, and the materials of other layers may be different. Furthermore, in some embodiments, the dielectric layer 206 may include at least one layer of polyimide film, but it is not limited thereto.

In some embodiments, when the dielectric layer 206 has a multiple layer structure, the material of the layer that is closest to the conductive layer 208 (or the layer that is in contact with the conductive layer 208) may include silicon oxide, silicon nitride, other suitable materials, or a combination thereof, but it is not limited thereto. In these embodiments, the difference in coefficient of thermal expansion (CTE) between the dielectric layer 206 and the conductive layer 208 may be mitigated, so that the warpage problem of the second substrate 202 may be improved.

Moreover, the dielectric layer 206 may have a third thickness $T_3$. In some embodiments, the third thickness $T_3$ may be greater than or equal to 5 μm and less than the second thickness $T_2$ of the second substrate 202 (i.e. 5 μm≤ the third thickness $T_3$≤second thickness $T_2$). In some embodiments, the third thickness $T_3$ of the dielectric layer 206 may be greater than or equal to 0.01 times of the wavelength $\lambda$ of the electromagnetic wave modulated by the electronic device 10B, and less than or equal to 1 time of the wavelength $\lambda$ of the electromagnetic wave modulated by the electronic device 10B (i.e. $0.01\lambda\leq$ the third thickness $T_3\leq\lambda$), such as $0.05\lambda$, $0.1\lambda$, $0.3\lambda$, $0.5\lambda$, $0.7\lambda$, or $0.9\lambda$.

Furthermore, according to the embodiments of the present disclosure, "the third thickness $T_3$" of the dielectric layer 206 refers to the maximum thickness of the dielectric layer 206 in the normal direction of the first substrate 102 (Z direction).

In some embodiments, the buffer layer 210 may include insulating material. In some embodiments, the material of the buffer layer 210 may include aforementioned organic material, the inorganic material, or a combination thereof, but it is not limited thereto, and is not repeated. Furthermore, the buffer layer 210 may include a single layer structure or a multilayered structure. In some embodiments, the buffer layer 210 may be omitted.

Figure 12:
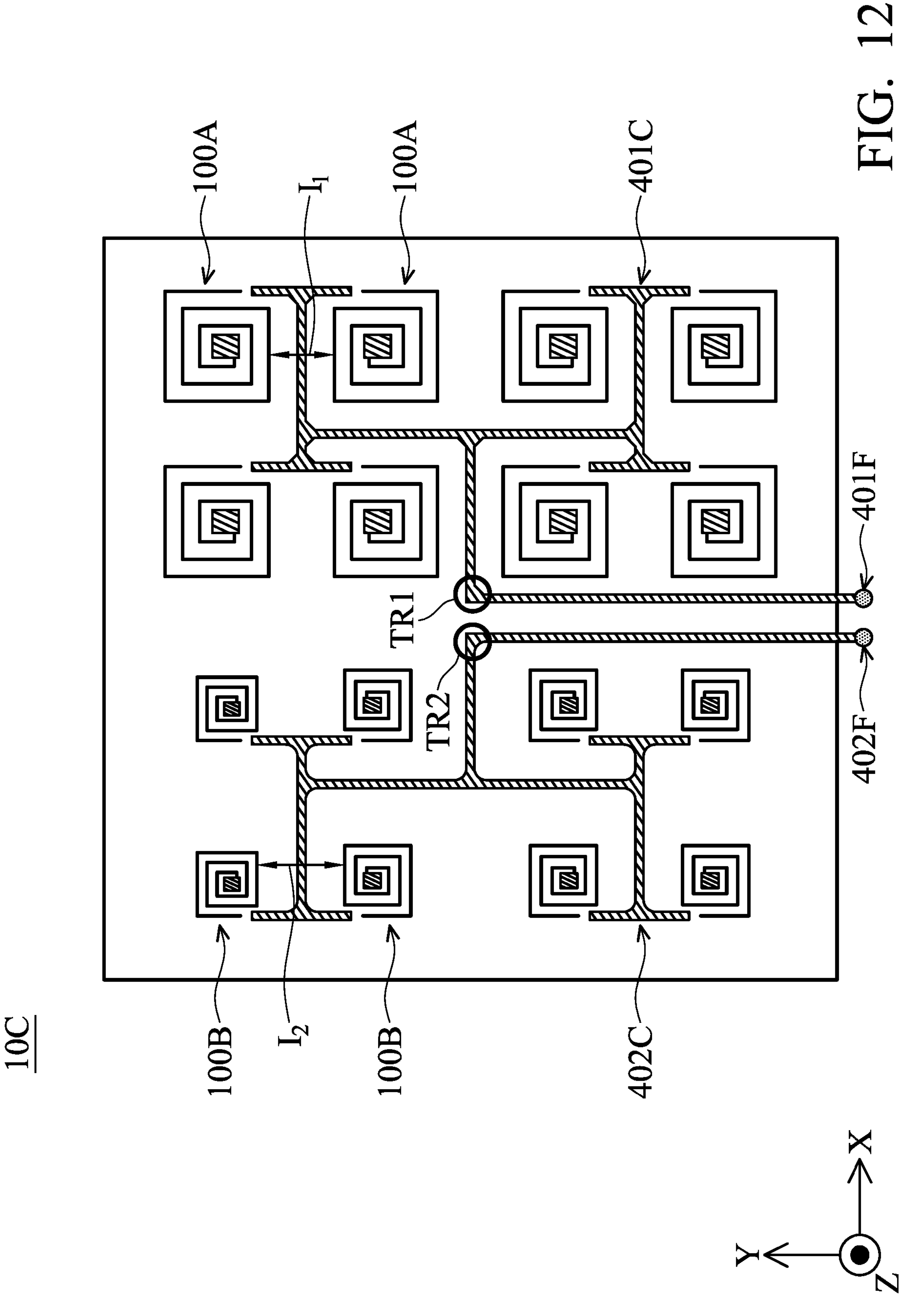
FIG. 12 is a top view of an electronic device in some embodiments of the present disclosure.

Afterwards, refer to FIG. 12, wherein FIG. 12 is a top view of an electronic device 10C in some embodiments of the present disclosure. It should be realized that identical element or similar elements will be denoted by identical or similar reference numerals, and the materials, the forming processes, and the functions are identical or similar to those described above, and is not repeated again.

The electronic device 10C shown in FIG. 12 is substantially similar to the electronic device 10A shown in FIG. 1. The distance (e.g. minimum distance) between the first modulation units 100A of the electronic device 10C may be identical to or different from the distance between the second modulation units 100B (e.g. the distance in the X direction and/or the Y direction) of the electronic device 10C. For example, in FIG. 12, the distance between the first modulation units 100A may be a distance $I_1$, the distance between the second modulation units 100B may be a distance $I_2$, and the distance $I_1$ may be greater than the distance $I_2$, but it is not limited thereto. In some alternative embodiments, the distance $I_1$ may be less than or equal to the distance $I_2$. The frequency of the first modulation unit 100A or the second modulation unit 100B may be adjusted by adjusting the distance between the modulation units, so that the first modulation unit 100A and the second modulation unit 100B may receive or transmit signals with different frequencies.

Furthermore, in FIG. 12, the structure at folding points of the first feeding structure 401C and the second feeding structure 402C may be different from the structure at folding points of the first feeding structure 401A and the second feeding structure 402A shown in FIG. 1. For example, as shown in FIG. 12, the folding points of the first feeding structure 401C (e.g. a first folding point TR1) may have a chamfer structure, and the folding points of the second feeding structure 402C (e.g. a second folding point TR2) may have an arc-angle structure. Furthermore, the width of the first feeding structure 401C or the second feeding structure 402C at the branch may be increased by the chamfer or the arc-angle, so the impedance of the first feeding structure 401C or the second feeding structure 402C may be reduced, and the strength of the first feeding structure 401C or the second feeding structure 402C may be increased. However, the present disclosure is not limited thereto. For example, the first feeding structure 401C may have arc-angle structure in some folding points, or the second feeding structure 402C may have chamfer structure in some folding points. Furthermore, it is also possible that only the first feeding structure 401C or the second feeding structure 402C has a different structure at the folding points, depending on design requirements. Moreover, the arc-angle structure and/or the chamfer structure can also be applied to the feeding structure of other embodiments of the present disclosure, and it is not limited.

Figure 13:
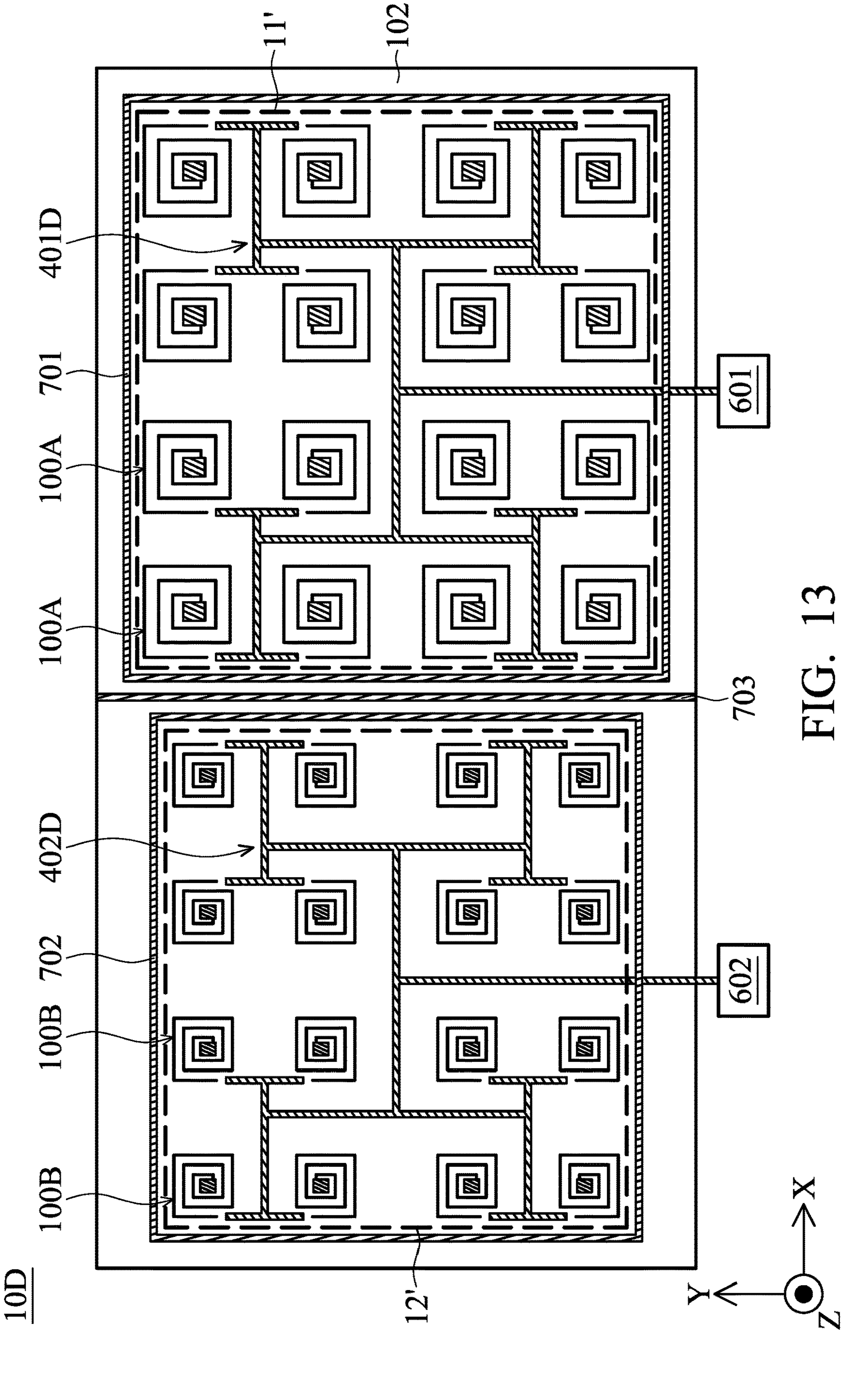
FIG. 13 is a top view of an electronic device in some embodiments of the present disclosure.

Afterwards, refer to FIG. 13, which is a top view of an electronic device 10D in some embodiments of the present disclosure. The electronic device 10D may be substantially similar to the electronic device 10C in FIG. 12, and the difference is that the number of first modulation units 100A and/or the second modulation units 100B of the electronic device 10C and the electronic device 10D are different. In some embodiments, the first modulation units 100A or the second modulation units 100B may arrange as multiple arrays. The electronic device 10D may be designed to have m*m first modulation units 100A and n*n second modulation units 100B, wherein n and m are positive integers. For example, 4*4 first modulation units 100A and 4*4 second modulation units 100B are shown in FIG. 13. Although the first modulation unit 100A and the second modulation unit 100B are shown as having identical number in FIG. 13, the disclosure is not limited thereto. For example, the number of first modulation unit 100A and the second modulation unit 100B may be different (that is, m and n are different positive integers).

However, the present disclosure is not limited thereto. In some embodiments, the number of first modulation unit 100A and the second modulation unit 100B may be different in each row and each column. For example, the electronic device 10D may also have $m_1$*$n_1$ first modulation units 100A and $m_2$*$n_2$ second modulation units 100B, wherein $m_1$, $m_2$, $n_1$, $n_2$ are positive integers, $m_1$ and $n_1$ may be different, and $m_2$ and $n_2$ can be different. In this way, a different number of first modulation units 100A and a different number of second modulation units 100B can be provided according to different design requirements to increase design flexibility.

The first feeding structure 401D of the foregoing embodiment may be coupled to a feeding source for receiving signals, and the second feeding structure 402D may be coupled to a feeding source for transmitting signals, but the present disclosure it not limited thereto. For example, in some embodiments, the first feeding structure 401D and the second feeding structure 402D may also be coupled to different feeding sources for receiving signals at the same time, or to different feeding sources for transmitting signals at the same time, and may respectively correspond to the signals having different frequencies to increase the design flexibility.

In addition, an additional isolating structure may be provided between the first feeding structure 401D and the second feeding structure 402D to reduce signal interference between the first feeding structure 401D and the second feeding structure 402D. For example, FIG. 13 also illustrates an isolating structure 701 surrounding the first antenna unit 11' (e.g., surrounding the first feeding structure 401D), and an isolating structure 702 surrounding the second antenna unit 12' (e.g., surrounding the second feeding structure 402D), and an isolating structure 703 between the first antenna unit 11' and the second antenna unit 12' (for example, between the first feeding structure 401D and the second feeding structure 402D). The isolating structure 701, the isolating structure 702, and the isolating structure 703 may be disposed in the liquid-crystal layer 300, and may be electrically insulated from the conductive layer 208, the first feeding structure 401D, and the second feeding structure 402D. In an embodiment, the isolating structure 701, the isolating structure 702, and/or the isolating structure 703 do not overlap the first modulation unit 100A, the second modulation unit 100B, the first feeding structure 401D, The second feeding structure 402D, the first phase shifting structure 501, and the second phase shifting structure 502 in a normal direction of the electronic device 10D. In some embodiments, the materials of the isolating structure 701, the isolating structure 702, or the isolating structure 703 may include the foregoing conductive material, transparent conductive material, or a combination thereof, which will not be repeated here. In some embodiments, the isolating structure 701, the isolating structure 702, or the isolating structure 703 may be provided on the electronic device 10D by a suitable thin film process or a transfer method, but it is not limited thereto.

By providing the conductive isolating structure 701, the isolating structure 702, and/or the isolating structure 703 between the first feeding structure 401D and the second feeding structure 402D, the interference of the signals between the first feeding structure 401D and the second feeding structure 402D may be reduced, so the stability of the electronic device 10D may be increased. Although the isolating structure 701, the isolating structure 702, and the isolating structure 703 are shown in FIG. 13 at the same time, the present disclosure is not limited thereto. In some embodiments, at least one of the isolating structure 701, the isolating structure 702, or the isolating structure 703 may be provided in the electronic device 10D.

In some embodiments, the first feeding structure 401D and the second feeding structure 402D may respectively be coupled to a first processor 601 and a second processor 602 that are different to independently control various signals. The first processor 601 and the second processor 602 may be mounted or packaged on the first substrate 102, or may be coupled to the first feeding structure 401D and the second feeding structure 402D by external wires (for example, through a flexible printed circuit (FPC)), and the disclosure is not limited thereto. The first processor 601 and the second processor 602 can perform different tasks, such as respectively processing signals with a high frequency or a low frequency, or respectively receiving or transmitting signals. For example, different feeding structures can also be coupled to an identical processor to reduce the number of elements in the electronic device.

Figure 14:
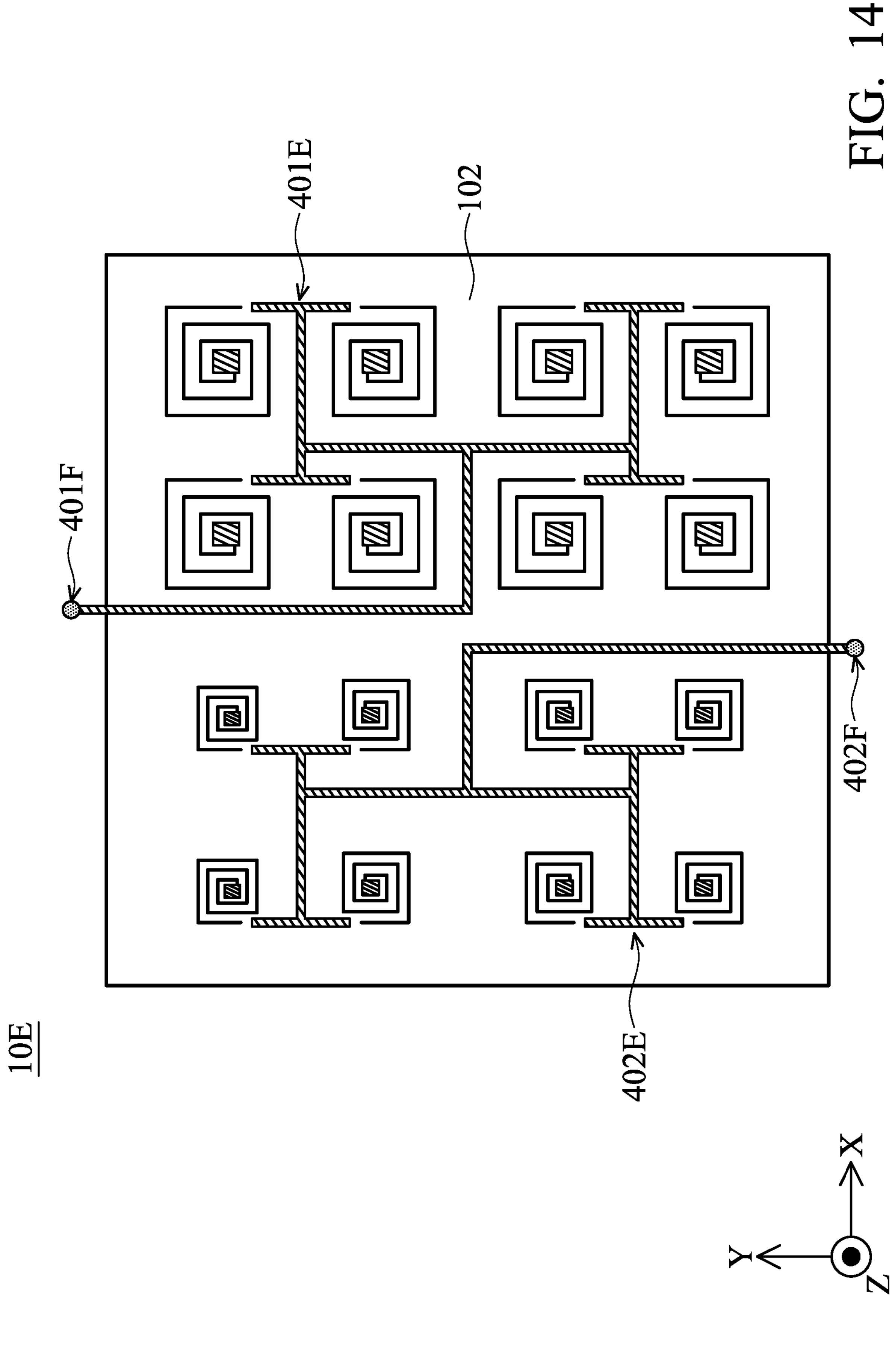
FIG. 14 is a top view of an electronic device in some embodiments of the present disclosure.

Next, please refer to FIG. 14, which shows a top view of the electronic device 10E according to some embodiments of the present disclosure.

The electronic device 10E of FIG. 14 is substantially similar to the electronic device 10A of FIG. 1, and the difference is that the first feeding source 401F connected to the first feeding structure 401E and the second feeding source 402F connected to the second feeding structure 402E may be disposed on different sides of the first substrate 102 (for example, different sides on the XY plane). For example, the first feeding source 401F and the second feeding source 402F may be disposed on opposite sides of the first substrate 102. Thereby, the distance between the first feeding source 401F and the second feeding source 402F may be increased to reduce the signal interference between the first feeding source 401F and the second feeding source 402F with different frequencies, or the space on the first substrate 102 may be effectively used, but the present disclosure is not limited thereto.

Figure 15:
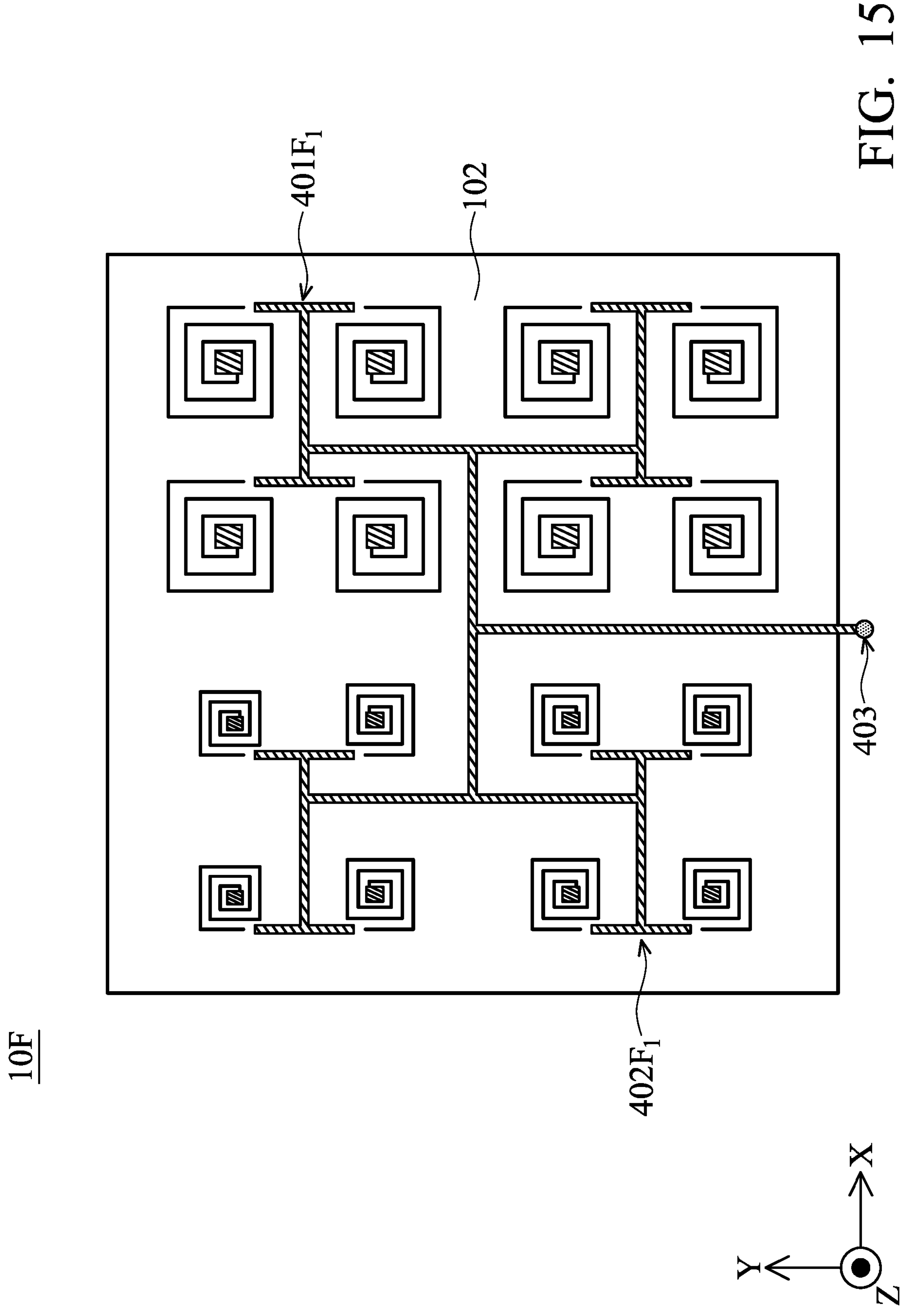
FIG. 15 is a top view of an electronic device in some embodiments of the present disclosure.

Next, please refer to FIG. 15, which shows a top view of the electronic device 10F according to some embodiments of the present disclosure.

The electronic device 10F of FIG. 15 is substantially similar to the electronic device 10A of FIG. 1, except that the first feeding structure 401F1 and the second feeding structure 402F1 can be connected to a common feeding source 403. The common feeding source 403 may provide different signals to the first feeding structure 401F1 and the second feeding structure 402F1 in different time periods (for example, for signal transmission and receiving signal, respectively). However, the present disclosure is not limited thereto. For example, the common feeding source 403 may also provide signals to the first feed structure 401F1 and the second feed structure 402F1 simultaneously, and the signals received by the first feed structure 401F1 and the second feed structure 402F1 can be distinguished by means of waveform processing. In this way, the number of required feeding sources or processors may be reduced to reduce production costs.

Although different feeding structures may be encapsulated by the same liquid-crystal layer 300 in the foregoing embodiments, the present disclosure is not limited thereto. Next, please refer to FIG. 16, which shows a cross-sectional view of an electronic device 10G according to some embodiments of the present disclosure.

Figure 16:
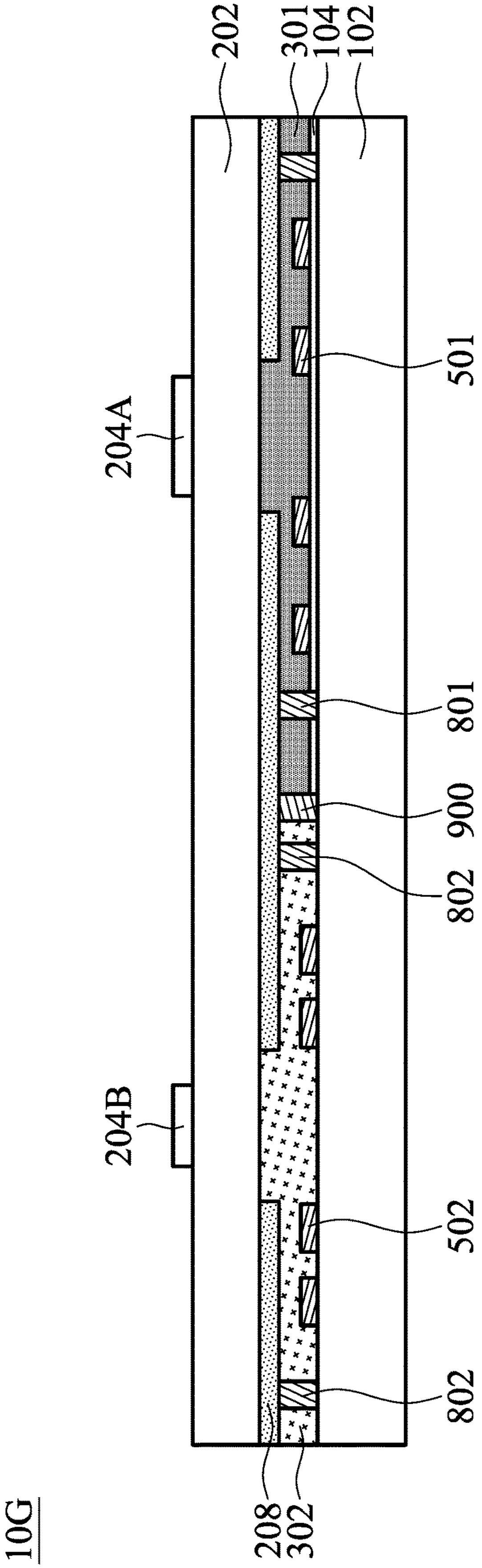
FIG. 16 is a cross-sectional view of an electronic device in some embodiments of the present disclosure.

The electronic device 10G of FIG. 16 is substantially similar to the electronic device 10A of FIG. 3, and the difference is that the first phase shifting structure 501 and the second phase shifting structure 502 of the electronic device 10G may be provided in a first liquid-crystal layer 301 and a second liquid-crystal layer 302 that are different. The material of the first liquid-crystal layer 301 may be different from the second liquid-crystal layer 302. Suitable materials may be selected, so the first liquid-crystal layer 301 and the second liquid-crystal layer 302 may resonate corresponding to the radio frequency signals from the first feeding source 401F and the second feeding source 402F (please refer to FIG. 1). In this way, the effect of signal transmission may be enhanced. In some embodiments, if the resonance frequency of the signal from the first feeding source 401F is less than the resonance frequency of the signal from the second feeding source 402F, the first liquid-crystal layer 301 corresponding to the first feeding source 401F may be designed to have a greater dielectric constant, and the second liquid-crystal layer 302 corresponding to the second feeding source 402F may be designed to have a lower dielectric constant to correspond to signals with different frequencies, but the present disclosure is not limited thereto. In addition, in some embodiments, a spacer 900 may be provided between the first liquid-crystal layer 301 and the second liquid-crystal layer 302 to separate the first liquid-crystal layer 301 and the second liquid-crystal layer 302.

In addition to changing the dielectric constants of the first liquid-crystal layer 301 and the second liquid-crystal layer 302 to correspond to the resonance frequencies of the signals from the first feeding source 401F and the second feeding source 402F, the thicknesses (cell gap) of the first liquid-crystal layer 301 and the second liquid-crystal layer 302 may be changed as well to achieve a similar effect. For example, if the resonance frequency of the signal from the first feeding source 401F is less than the resonance frequency of the signal from the second feeding source 402F, the thickness of the first liquid-crystal layer 301 corresponding to the first feeding source 401F may be designed to be less than the thickness of the second liquid-crystal layer 302 corresponding to the feeding source 402F. As a result, the first liquid-crystal layer 301 and the second liquid-crystal layer 302 may respectively correspond to the resonance frequencies of the first feeding source 401F and the second feeding source 402F to enhance the signal transmission. For example, an additional insulating layer 104 may be provided between the first liquid-crystal layer 301 and the first substrate 102 to reduce the thickness of the first liquid-crystal layer 301 (change the distance between the first phase shifting structure 501 and the conductive layer 208). The material of the insulating layer 104 may be the same as or similar to the material of the dielectric layer 206, which will not be repeated here.

In some embodiments, spacers with different heights (for example, different heights in the Z direction) may be provided in the electronic device 10G to change the thicknesses of the first liquid-crystal layer 301 and the second liquid-crystal layer 302 to strengthen the structural strength of the electronic device 10G. For example, in FIG. 16, first spacers 801 are disposed in the first liquid-crystal layer 301, second spacers 802 are disposed in the second liquid-crystal layer 302, and the heights of the first spacers 801 and the second spacers 802 in the Z direction may be different. For example, the height of the first spacers 801 may be less than the height of the second spacers 802 in the Z direction, but it is not limited thereto.

In some embodiments, the first spacers 801 and/or the second spacers 802 may have a ring structure in a top view. In some embodiments, the spacers may have a columnar structure, but it is not limited thereto. Furthermore, the first spacers 801 and the second spacers 802 may include the aforementioned insulating material, the conductive material, or a combination thereof, which will not be repeated here.

In some embodiments, the viscosities of the first liquid-crystal layer 301 and the second liquid-crystal layer 302 can also be selected according to the difference of the required resonance frequency. When the resonance frequency is greater, the viscosity of the liquid-crystal corresponding to the liquid-crystal layer is smaller. For example, the first liquid-crystal layer 301 and the second liquid-crystal layer 302 may be designed to have different viscosities (for example, the viscosity of the second liquid-crystal layer 302 may be less than the viscosity of the first liquid-crystal layer 301), so that the first antenna unit 11 and the second antenna unit 12 can respectively correspond to signals having different frequencies.

Next, please refer to FIG. 17 to FIG. 20, which are top views of the phase shifting structure 503, the phase shifting structure 504, the phase shifting structure 505, and the phase shifting structure 506 according to some embodiments of the present disclosure, respectively. As shown in FIG. 17 to FIG. 20, in some embodiments, the phase shifting structure may have an irregular shape, and may have at least one folding point BP. For example, in some embodiments, the phase shifting structure may have at least one concavo-convex portion, a spiral shape, an arc shape, or a loop-shaped surrounding portion, or a combination thereof, but the present disclosure is not limited thereto.

As shown in FIG. 17 to FIG. 20, the phase shifting structure 503, the phase shifting structure 504, the phase shifting structure 505, and the phase shifting structure 506 may have an endpoint $\mathbf{503}t_1$ and an endpoint $\mathbf{503}t_2$, an endpoint $\mathbf{504}t_1$ and an endpoint $\mathbf{504}t_2$, an endpoint $\mathbf{505}t_1$ and an endpoint $\mathbf{505}t_2$, an endpoint $\mathbf{506}t_1$ and an endpoint $\mathbf{506}t_2$, respectively. In some embodiments, a portion of the phase shifting structure that is adjacent to one of the endpoints may extend along a second length direction $H_2$, and a portion of the phase shifting adjacent to another endpoint may extend along a third length direction $H_3$. In some embodiments, the second length direction $H_2$ may be substantially perpendicular to the third length direction $H_3$ (e.g., the embodiment shown in FIG. 17) or substantially parallel to the third length direction $H_3$ (e.g., the embodiments shown FIG. 18 to FIG. 20), but it is not limited thereto. In other embodiments, the angle (not shown) between the second length direction $H_2$ and the third length direction $H_3$ may range from degrees to 270 degrees (5 degrees≤the angle≤270 degrees), such as 45 degrees, 90 degrees, 120 degrees, or 200 degrees.

Furthermore, in some embodiments, the phase shifting structure 503, the phase shifting structure 504, the phase shifting structure 505, or the phase shifting structure 506 may have a length L and a width W. In some embodiments, the length L and/or width W of the phase shifting structure 503, the phase shifting structure 504, the phase shifting structure 505, or the phase shifting structure 506 may range from 0.3 times the operating wavelength (λ) to 0.8 times the operating wavelength (i.e., 0.3λ≤length L≤0.8λ and/or 0.3λ≤width W≤0.8λ), such as 0.4 times the operating wavelength, 0.5 times the operating wavelength, 0.6 times the operating wavelength, or 0.7 times the operating wavelength.

Specifically, in some embodiments, the frequency of the operable radio frequency signal may be between 0.7 GHz and 300 GHz (0.7 GHz≤frequency≤300 GHz), so the range of the length L and/or width W may be between 0.1 mm and 300 mm (0.1 mm≤length L≤300 mm and/or 0.1 mm≤width W≤300 mm), such as 10 mm, 50 mm, 100 mm, 150 mm, or 200 mm.

According to some embodiments of the present disclosure, for the phase shifting structure 503, the phase shifting structure 504, the phase shifting structure 505, or the phase shifting structure 506 with a rectangular, elliptical, or elongated shape, the length L may be defined as the maximum dimension in its longitudinal direction (such as the Y direction in FIG. 17 to FIG. 20). For a phase shifting structure that does not have a clear long axis, the length L may be defined as the long side of the smallest rectangle that can surround the phase shifting structure 503, the phase shifting structure 504, the phase shifting structure 505, or the phase shifting structure 506. Similarly, the width W may be defined as the maximum dimension in the lateral direction (such as the X direction in FIG. 17 to FIG. 20). For a phase shifting structure that does not have a clear short axis, the width W may be defined as the short side of the smallest rectangle that can surround the phase shifting structure.

Figure 17:
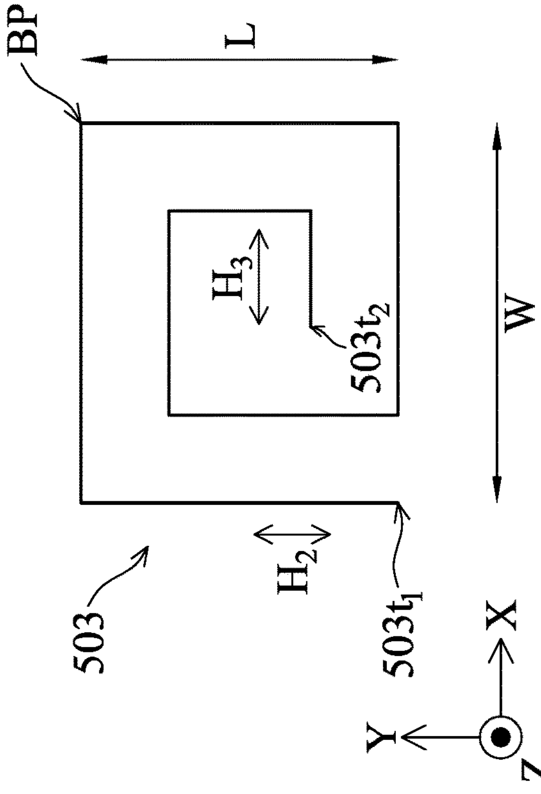
FIG. 17 to FIG. 20 are top views of the phase shifting structure in some embodiments of the present disclosure.
Figure 18:
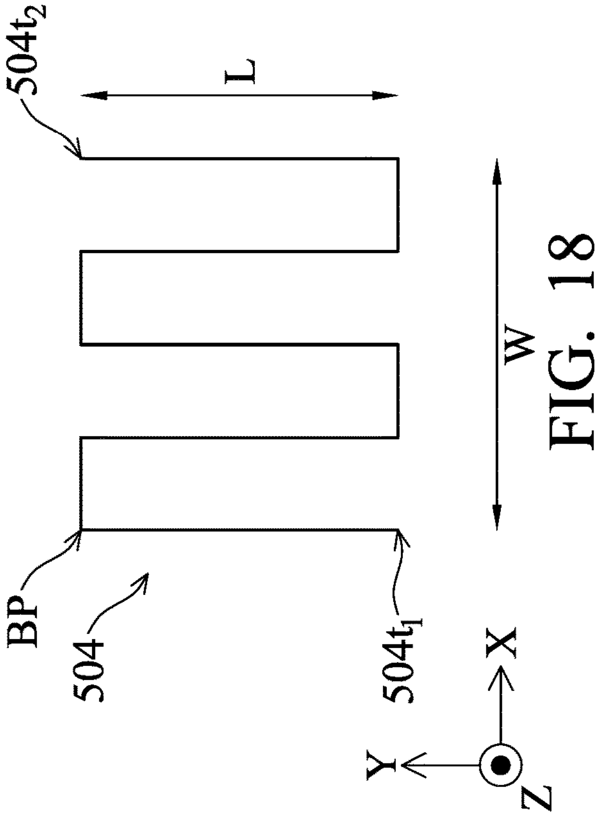
Figure 19:
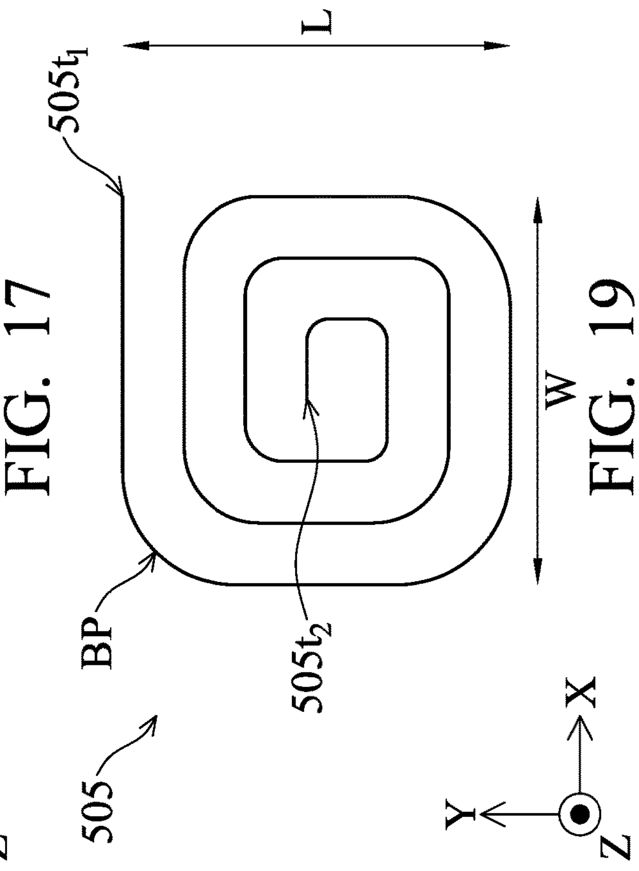
Figure 20:
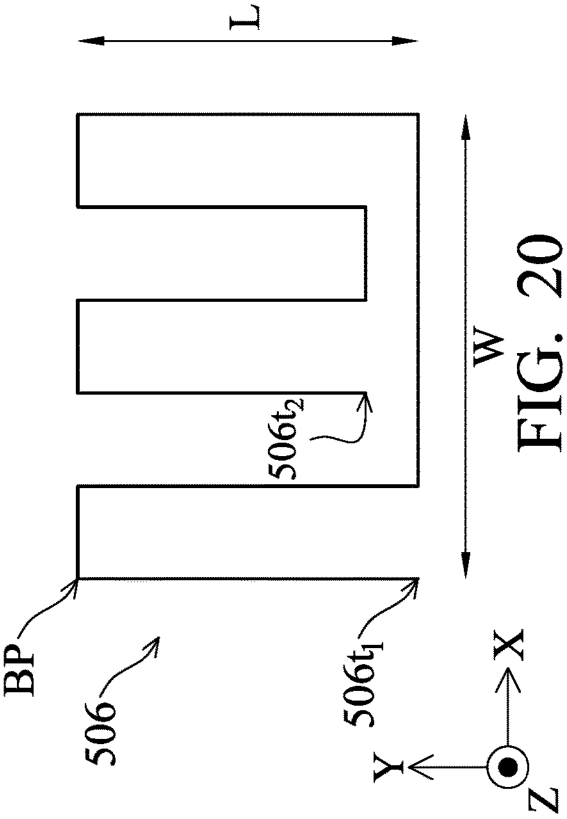

In addition, in some embodiments, the total length of the phase shifting structure 503, the phase shifting structure 504, the phase shifting structure 505, or the phase shifting structure 506 (i.e., the total length from one end point to the other end point) may range from 5 mm to 2100 mm (5 mm≤total length≤2100 mm), such as 10 mm, 100 mm, 500 mm, 1000 mm, or 1500 mm. In addition, as shown in FIG. 17 and FIG. 19, in some embodiments, the phase shifting structure 503, or the phase shifting structure 505 may have a plurality of loops. In such embodiments, the number of loops may range between 1 turn and 20 turns (1 turn≤ the number of turns≤20 turns), such as 3 turns, 6 turns, 10 turns, or 15 turns.

As shown in FIG. 17 to FIG. 20, by changing the structure or folding type of the phase shifting structure 503, the phase shifting structure 504, the phase shifting structure 505, or the phase shifting structure 506, the corresponding signal frequency may also be changed. The phase shifting structures of the foregoing embodiments (for example, the first phase shifting structure 501 and the second phase shifting structure 502 in FIG. 1) may be replaced by the phase shifting structure 503, the phase shifting structure 504, the phase shifting structure 505, or the phase shifting structure 506 in this embodiment to meet different requirements. For example, the phase shifting structures of the first antenna unit 11, the first antenna unit 11', the second antenna unit 12, or the second antenna unit 12' in the aforementioned electronic device may also be replaced by the phase shifting structures with different folding types (such as respectively replaced by the phase shifting structure 503 and the phase shifting structure 504, but it is not limited thereto), to transmit signals with different frequencies separately.

In summary, an electronic device that may provide different patterns for antenna units of different frequencies is provided in some embodiments of the present disclosure. As a result, different antenna units may operate simultaneously, and the performance of the electronic device may be improved, interference between signals with different frequencies may be reduced, or the utilization of space on electronic devices may be increased, but it is not limited thereto.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure. The scope of the present disclosure is defined by the attached claims.

What is claimed is:

1. An electronic device, comprising:

a substrate;

a first antenna unit disposed on the substrate and comprising a first pattern structure;

a second antenna unit disposed on the substrate and comprising a second pattern structure, wherein the second pattern structure is different from the first pattern structure; and a feeding unit disposed on the substrate and comprising a first feeding structure coupled to the first pattern structure and a second feeding structure coupled to the second pattern structure;

wherein at least one of the first feeding structure and the second feeding structure comprises at least one folding point, and the folding point has a chamber structure or an arc-angle structure.

2. The electronic device as claimed in claim 1, wherein the at least one of the first feeding structure and the second feeding structure further comprise a feeding line, and a width of the folding point is greater than a width of the feeding line.

3. The electronic device as claimed in claim 2, wherein a width of the feeding line is greater than or equal to a width of the first pattern structure.

4. The electronic device as claimed in claim 2, wherein a thickness of the feeding line is greater than or equal to a thickness of the first pattern structure.

5. The electronic device as claimed in claim 1, wherein a width of the folding point is greater than a width of the first pattern structure.

6. The electronic device as claimed in claim 1, further comprising:

a first feeding source couple to the first feeding structure; and a second feeding source coupled to the second feeding structure.

7. The electronic device as claimed in claim 6, wherein the first feeding source and the second feeding source are on an identical side of a surface of the substrate.

8. The electronic device as claimed in claim 6, wherein the first feeding source and the second feeding source are on opposite sides of a surface of the substrate.

9. The electronic device as claimed in claim 1, wherein the first antenna unit further comprises a first patch partially overlap the first pattern structure in a normal direction of the substrate.

10. The electronic device as claimed in claim 9, wherein the first pattern structure comprises at least two folding points and the first patch overlaps the at least two folding points of the first pattern structure.

11. The electronic device as claimed in claim 9, wherein the first patch overlaps an end point of the first pattern structure.

12. The electronic device as claimed in claim 1, wherein the first pattern structure and the second pattern structure have different numbers of folding points.

13. The electronic device as claimed in claim 1, wherein the first pattern structure and the second pattern structure are different in length.

14. The electronic device as claimed in claim 1, wherein the first antenna unit further comprises a third pattern structure, the second antenna unit further comprises a fourth pattern structure, and a distance between the first pattern structure and the third pattern structure is different from a distance between the second pattern structure and the fourth pattern structure.

* * * * *